(12) United States Patent  
GilroySmith et al.

(10) Patent No.: US 9,650,157 B2  
(45) Date of Patent: May 16, 2017

(54) DRIVE MECHANISMS FOR USE IN CONTROLLING ROTATION AND TWIST OF A TETHER

(71) Applicant: X Development LLC, Mountain View, CA (US)

(72) Inventors: Bryan Christopher GilroySmith, San Francisco, CA (US); Brian Hachtmann, San Martin, CA (US); Elias Wolfgang Patten, Seattle, WA (US); Damon Vander Lind, Alameda, CA (US)

(73) Assignee: X Development LLC, Mountain View, CA (US)

( * ) Notice: Subject to any disclaimer, the term of this patent is extended or adjusted under 35 U.S.C. 154(b) by 37 days.

(21) Appl. No.: 14/586,947

(22) Filed: Dec. 30, 2014

(65) Prior Publication Data

US 2015/0375873 A1    Dec. 31, 2015

Related U.S. Application Data

(60) Provisional application No. 62/019,273, filed on Jun. 30, 2014.

(51) Int. Cl.
| | | |
|---|---|---|
| *B64F 1/02* | (2006.01) | |
| *B64F 3/02* | (2006.01) | |
| *F03D 7/02* | (2006.01) | |

(52) U.S. Cl.
CPC .......... *B64F 3/02* (2013.01); *F03D 7/02* (2013.01); *F05B 2240/921* (2013.01); *Y02E 10/723* (2013.01)

(58) Field of Classification Search
CPC ...... B64F 1/12; B64F 3/00; B64F 3/02; B64C 39/022; F03D 7/02; F05B 2240/921
See application file for complete search history.

(56) References Cited

U.S. PATENT DOCUMENTS

| 6,628,338 B1 | 9/2003 | Elberbaum et al. |
| 7,317,261 B2 | 1/2008 | Rolt |
| (Continued) | | |

FOREIGN PATENT DOCUMENTS

| TW | 360552 | 6/1999 |
| WO | WO 2013/100849 | 7/2013 |
| WO | WO2013/052178 | 9/2013 |

OTHER PUBLICATIONS

International Search Report and Written Opinion prepared by the Korean Patent Office in International Application No. PCT/US2015/037284 mailed Sep. 25, 2015.

(Continued)

*Primary Examiner* — Philip J Bonzell  
(74) *Attorney, Agent, or Firm* — McDonnell Boehnen Hulbert & Berghoff LLP

(57) ABSTRACT

A system may include a tether, a tether gimbal assembly, a drive mechanism, and a control system. The tether may include a distal end, a proximate end, and at least one conductor. The tether gimbal assembly may be connected to the tether. The drive mechanism may be coupled to the tether gimbal assembly and may include a housing, a spindle, and a motor. The housing may be fixed to the tether gimbal assembly. The spindle may be rotatably coupled to the housing, and the tether may be coupled to the spindle and rotate in conjunction with the spindle. The motor may be coupled to the spindle and configured to rotate the spindle and the tether. And the control system may be configured to operate the drive mechanism to control twist in the tether.

15 Claims, 13 Drawing Sheets

(56) References Cited

U.S. PATENT DOCUMENTS

| | | |
|---|---|---|
| 8,083,174 B2 | 12/2011 | Lee |
| 8,247,912 B2 | 8/2012 | Da Costa Duarte Pardal et al. |
| 8,350,403 B2 | 1/2013 | Carroll |
| 8,791,585 B2 | 7/2014 | Calverley |
| 9,211,951 B2* | 12/2015 | Hachtmann ............ B64C 39/022 |
| 9,214,022 B1* | 12/2015 | Hallamask .............. G06T 7/004 |
| 9,216,824 B2* | 12/2015 | Hachtmann ............ B64C 39/022 |
| 2007/0176432 A1 | 8/2007 | Rolt |
| 2008/0265086 A1 | 10/2008 | Lee |
| 2010/0013236 A1 | 1/2010 | Carroll |
| 2010/0230546 A1 | 9/2010 | Bevirt et al. |
| 2010/0295303 A1 | 11/2010 | Vander Lind |
| 2011/0101692 A1 | 5/2011 | Bilaniuk |
| 2011/0266395 A1 | 11/2011 | Bevirt |
| 2013/0221679 A1 | 8/2013 | Vander Lind |
| 2015/0041598 A1 | 2/2015 | Nugent et al. |
| 2015/0054282 A1 | 2/2015 | Goldstein |
| 2015/0158585 A1* | 6/2015 | Hachtmann ............ B64C 39/022 439/18 |
| 2015/0158586 A1* | 6/2015 | Hachtmann ............ B64C 39/022 244/110 C |
| 2015/0180186 A1* | 6/2015 | Vander Lind .......... H01R 35/02 290/55 |
| 2015/0275861 A1 | 10/2015 | Goldstein |
| 2015/0375874 A1* | 12/2015 | Patten ...................... B64F 3/02 244/110 C |

OTHER PUBLICATIONS

International Search Report and Written Opinion prepared by the Korean Patent Office in International Application No. PCT/US2015/037091 mailed Sep. 24, 2015.

\* cited by examiner

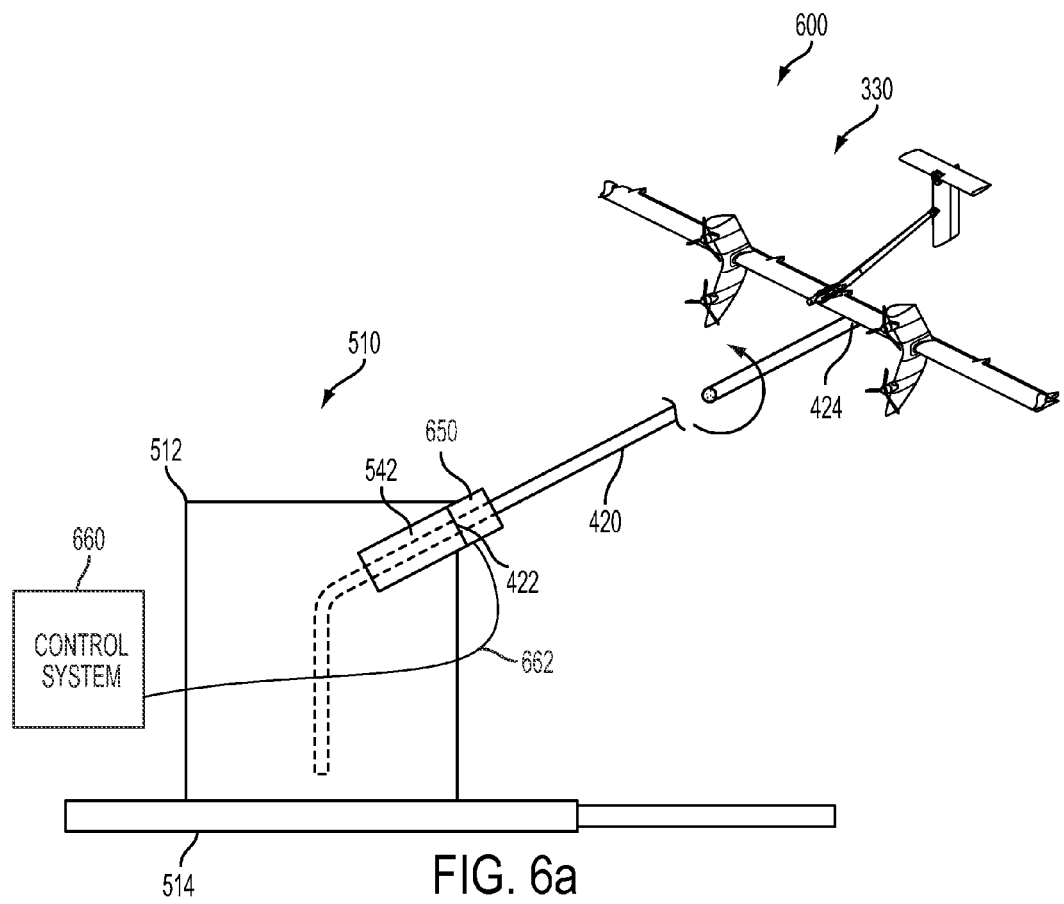
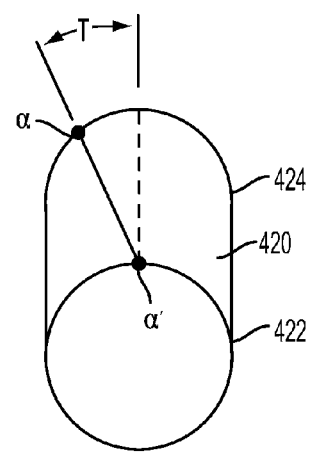
FIG. 6a
FIG. 6b

DRIVE MECHANISMS FOR USE IN CONTROLLING ROTATION AND TWIST OF A TETHER

CROSS-REFERENCE TO RELATED APPLICATION

The present application claims the benefit of U.S. Provisional Application No. 62/019,273, filed Jun. 30, 2014. The entire disclosure contents of U.S. Provisional Application No. 62/019,273 are herewith incorporated by reference into the present application.

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy.

SUMMARY

Drive mechanisms for use in controlling rotation and twist of a tether are described herein. More specifically, example embodiments generally relate to systems that incorporate a ground station for tethering aerial vehicles. During certain flight modes, the tether connecting the aerial vehicle to the ground station may twist as the aerial vehicle orbits about an axis relative to the ground station. Beneficially, embodiments described herein may control rotation and twist of the tether so as to avoid breaking components of the tether and/or improve a fatigue life of the tether.

In one aspect, a system is disclosed. The system may include a tether that includes a distal tether end, a proximate tether end, and at least one insulated electrical conductor. Further, the system may include a tether gimbal assembly. The tether gimbal assembly may be coupled to the tether. Further, the system may include a drive mechanism coupled to the tether gimbal assembly. The drive mechanism may include a housing fixed to the tether gimbal assembly; a spindle rotatably coupled to the housing, where the tether is coupled to the spindle and rotates in conjunction with the spindle; and a motor coupled to the spindle and configured to rotate the spindle and the tether. Yet further, the system may include a control system configured to operate the drive mechanism to control twist in the tether.

In another aspect, a system is disclosed. The system may include a tether that includes a distal tether end, a proximate tether end, and at least one insulated electrical conductor. Further, the system may include a tether gimbal assembly. The tether gimbal assembly may be coupled to the tether. Further, the system may include a drive mechanism coupled to the tether gimbal assembly. The drive mechanism may include a housing fixed to the tether gimbal assembly; a spherical thrust roller bearing; a spindle rotatably coupled to the housing via at least the spherical thrust roller bearing, where the tether is coupled to the spindle and rotates in conjunction with the spindle; and a motor coupled to the housing and configured to rotate the spindle and tether via a chain-and-sprocket assembly. Yet further, the system may include a control system configured to operate the drive mechanism to control twist in the tether.

In another aspect, a method is disclosed. The method may include launching an aerial vehicle coupled to a tether. Further, the method may include transitioning the aerial vehicle to crosswind flight. Yet further, the method may include controlling, by a control system coupled to a drive mechanism, an amount of twist in the tether during crosswind flight.

In yet another aspect, a system is disclosed. The system may include means for launching an aerial vehicle coupled to a tether. Further, the system may include means for transitioning the aerial vehicle to crosswind flight. Yet further, the system may include means for controlling an amount of twist in the tether during crosswind flight.

These as well as other aspects, advantages, and alternatives, will become apparent to those of ordinary skill in the art by reading the following detailed description, with reference where appropriate to the accompanying drawings.

BRIEF DESCRIPTION OF THE FIGURES

FIG. 6a depicts a system for controlling rotation and twist of a tether, according to an example embodiment.

FIG. 6b depicts a foreshortened view of a tether section, according to an example embodiment.

DETAILED DESCRIPTION

Figure 1:
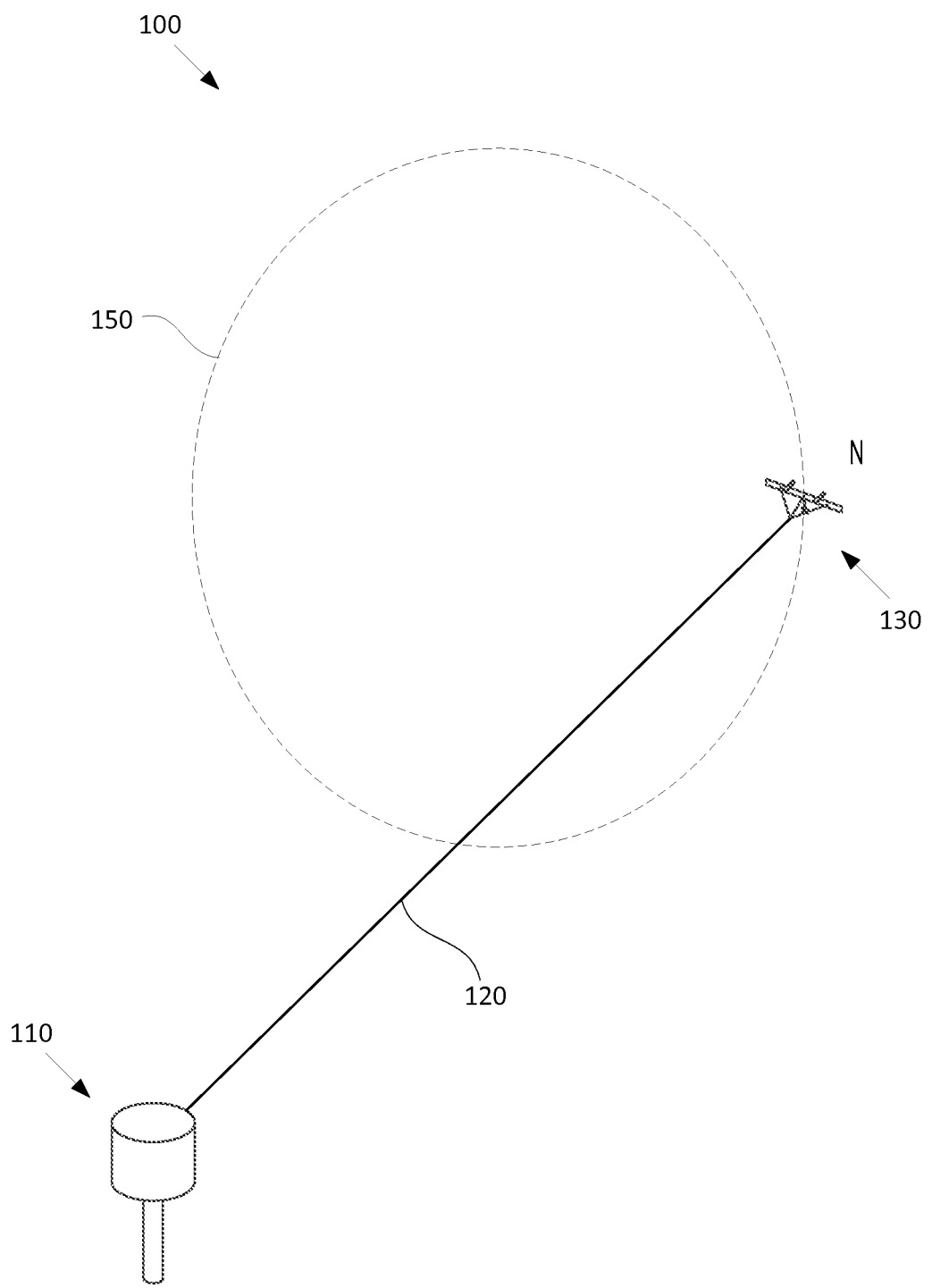
FIG. 1 depicts an Airborne Wind Turbine (AWT), according to an example embodiment.

Exemplary systems and methods are described herein. It should be understood that the word "exemplary" is used herein to mean "serving as an example, instance, or illustration." Any embodiment or feature described herein as "exemplary" or "illustrative" is not necessarily to be construed as preferred or advantageous over other embodiments or features. More generally, the embodiments described herein are not meant to be limiting. It will be readily understood that certain aspects of the disclosed systems and methods can be arranged and combined in a wide variety of different configurations, all of which are contemplated herein.

I. OVERVIEW

Illustrative embodiments relate to aerial vehicles, which may be used in a wind energy system, such as an Airborne Wind Turbine (AWT). In particular, illustrative embodiments may relate to or take the form of systems for controlling rotation and twist of a tether that connects an aerial vehicle to a ground station.

By way of background, an AWT may include an aerial vehicle that flies in a closed path, such as a substantially circular path, to convert kinetic wind energy to electrical energy. In an illustrative implementation, the aerial vehicle may be connected to a ground station via a tether. While tethered, the aerial vehicle can: (i) fly at a range of elevations and substantially along the path, and return to the ground, and (ii) transmit electrical energy to the ground station via the tether. (In some implementations, the ground station may transmit electricity to the aerial vehicle for take-off and/or landing.)

In an AWT, an aerial vehicle may rest in and/or on a ground station (or perch) when the wind is not conducive to power generation. When the wind is conducive to power generation, such as when a wind speed may be 3.5 meters per second (m/s) at an altitude of 200 meters (m), the ground station may deploy (or launch) the aerial vehicle. In addition, when the aerial vehicle is deployed and the wind is not conducive to power generation, the aerial vehicle may return to the ground station.

Moreover, in an AWT, an aerial vehicle may be configured for hover flight and crosswind flight. Crosswind flight may be used to travel in a motion, such as a substantially circular motion, and thus may be the primary technique that is used to generate electrical energy. Hover flight in turn may be used by the aerial vehicle to prepare and position itself for crosswind flight. In particular, the aerial vehicle could ascend to a location for crosswind flight based at least in part on hover flight. Further, the aerial vehicle could take-off and/or land via hover flight.

In hover flight, a span of a main wing of the aerial vehicle may be oriented substantially parallel to the ground, and one or more propellers of the aerial vehicle may cause the aerial vehicle to hover over the ground. In some implementations, the aerial vehicle may vertically ascend or descend in hover flight. Moreover, in crosswind flight, the aerial vehicle may be oriented, such that the aerial vehicle may be propelled by the wind substantially along a closed path, which as noted above, may convert kinetic wind energy to electrical energy. In some implementations, one or more rotors of the aerial vehicle may generate electrical energy by slowing down the incident wind.

During crosswind flight, the tether connecting the aerial vehicle to the ground station may twist as the aerial vehicle orbits about an axis relative to the ground station. In some implementations, the amount of twist between the ground station end of the tether and the aerial vehicle end of the tether may vary based on a number of parameters during crosswind flight. Twist in the tether may have beneficial or detrimental effects on the system, depending on the system design and operating parameters.

Embodiments described herein may allow for controlling the rotation and twist of the tether for maximum benefit. In an illustrative implementation, a system may control the rotation, and amount of twist, of the tether when the tether is orbiting during crosswind flight of the aerial vehicle. In the case of a tether with electrical conductor(s), it may be desirable to maintain the twist in the tether within a certain range to reduce a strain of the conductors. Beneficially, such a reduction of the strain may avoid breaking the conductors and/or may improve a fatigue life of the tether.

In example embodiments, a system may include a tether, a tether gimbal assembly, a drive mechanism, and a control system. In an example embodiment, the control system may be configured to operate the drive mechanism to rotate the tether in order to control the amount of twist in the tether. With this arrangement, the amount of twist in the tether during crosswind flight of the aerial vehicle may be actively controlled.

In some implementations, the drive mechanism may include a housing fixed to the tether gimbal assembly; a spindle rotatably coupled to the housing, where the tether is coupled to the spindle and rotates in conjunction with the spindle; and a motor coupled to the spindle. The motor may be configured to rotate the spindle and the tether.

Moreover, in some implementations, the drive mechanism may include a housing fixed to the tether gimbal assembly; a spherical thrust roller bearing; a spindle rotatably coupled to the housing via at least the spherical thrust roller bearing, where the tether is coupled to the spindle and rotates in conjunction with the spindle; and a motor coupled to the housing. The motor may be configured to rotate the spindle and the tether via a chain-and-sprocket assembly.

Other embodiments may relate to methods for controlling rotation and twist of a tether. For instance, in some implementations, a method may involve launching an aerial vehicle connected to the tether, transitioning the aerial vehicle to crosswind flight, and controlling, by a control system coupled to a drive mechanism, an amount of twist in the tether during crosswind flight.

II. ILLUSTRATIVE SYSTEMS

A. Airborne Wind Turbine (AWT)

FIG. 1 depicts an AWT 100, according to an example embodiment. In particular, the AWT 100 includes a ground station 110, a tether 120, and an aerial vehicle 130. As shown in FIG. 1, the tether 120 may be connected to the aerial vehicle on a first end and may be connected to the ground station 110 on a second end. In this example, the tether 120 may be attached to the ground station 110 at one location on the ground station 110, and attached to the aerial vehicle 130 at three locations on the aerial vehicle 130. However, in other examples, the tether 120 may be attached at multiple locations to any part of the ground station 110 and/or the aerial vehicle 130.

The ground station 110 may be used to hold and/or support the aerial vehicle 130 until it is in an operational mode. The ground station 110 may also be configured to allow for the repositioning of the aerial vehicle 130 such that deploying of the device is possible. Further, the ground station 110 may be further configured to receive the aerial vehicle 130 during a landing. The ground station 110 may be formed of any material that can suitably keep the aerial vehicle 130 attached and/or anchored to the ground while in hover flight, crosswind flight, and other flight modes, such as forward flight (which may be referred to as airplane-like flight). In some implementations, a ground station 110 may be configured for use on land. However, a ground station 110 may also be implemented on a body of water, such as a lake, river, sea, or ocean. For example, a ground station could include or be arranged on a floating off-shore platform or a boat, among other possibilities. Further, a ground station 110 may be configured to remain stationary or to move relative to the ground or the surface of a body of water.

In addition, the ground station 110 may include one or more components (not shown), such as a winch, that may vary a length of the tether 120. For example, when the aerial vehicle 130 is deployed, the one or more components may be configured to pay out and/or reel out the tether 120. In some implementations, the one or more components may be configured to pay out and/or reel out the tether 120 to a predetermined length. As examples, the predetermined length could be equal to or less than a maximum length of the tether 120. Further, when the aerial vehicle 130 lands in the ground station 110, the one or more components may be configured to reel in the tether 120.

The tether 120 may transmit electrical energy generated by the aerial vehicle 130 to the ground station 110. In addition, the tether 120 may transmit electricity to the aerial vehicle 130 in order to power the aerial vehicle 130 for takeoff, landing, hover flight, and/or forward flight. The tether 120 may be constructed in any form and using any material which may allow for the transmission, delivery, and/or harnessing of electrical energy generated by the aerial vehicle 130 and/or transmission of electricity to the aerial vehicle 130. The tether 120 may also be configured to withstand one or more forces of the aerial vehicle 130 when the aerial vehicle 130 is in an operational mode. For example, the tether 120 may include a core configured to withstand one or more forces of the aerial vehicle 130 when the aerial vehicle 130 is in hover flight, forward flight, and/or crosswind flight. The core may be constructed of any high strength fibers. In some examples, the tether 120 may have a fixed length and/or a variable length. For instance, in at least one such example, the tether 120 may have a length of 140 meters.

The aerial vehicle 130 may be configured to fly substantially along a closed path 150 to generate electrical energy. The term "substantially along," as used in this disclosure, refers to exactly along and/or one or more deviations from exactly along that do not significantly impact generation of electrical energy.

The aerial vehicle 130 may include or take the form of various types of devices, such as a kite, a helicopter, a wing and/or an airplane, among other possibilities. The aerial vehicle 130 may be formed of solid structures of metal, plastic and/or other polymers. The aerial vehicle 130 may be formed of any material which allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction.

The closed path 150 may be various different shapes in various different embodiments. For example, the closed path 150 may be substantially circular. And in at least one such example, the closed path 150 may have a radius of up to 265 meters. The term "substantially circular," as used in this disclosure, refers to exactly circular and/or one or more deviations from exactly circular that do not significantly impact generation of electrical energy as described herein. Other shapes for the closed path 150 may be an oval, such as an ellipse, the shape of a jelly bean, the shape of the number of 8, etc.

The aerial vehicle 130 may be operated to travel along one or more revolutions of the closed path 150. As shown in FIG. 1, the number of revolutions of the closed path 150 that the aerial vehicle 130 has traveled along may be represented by N.

B. Illustrative Components of an AWT

Figure 2:
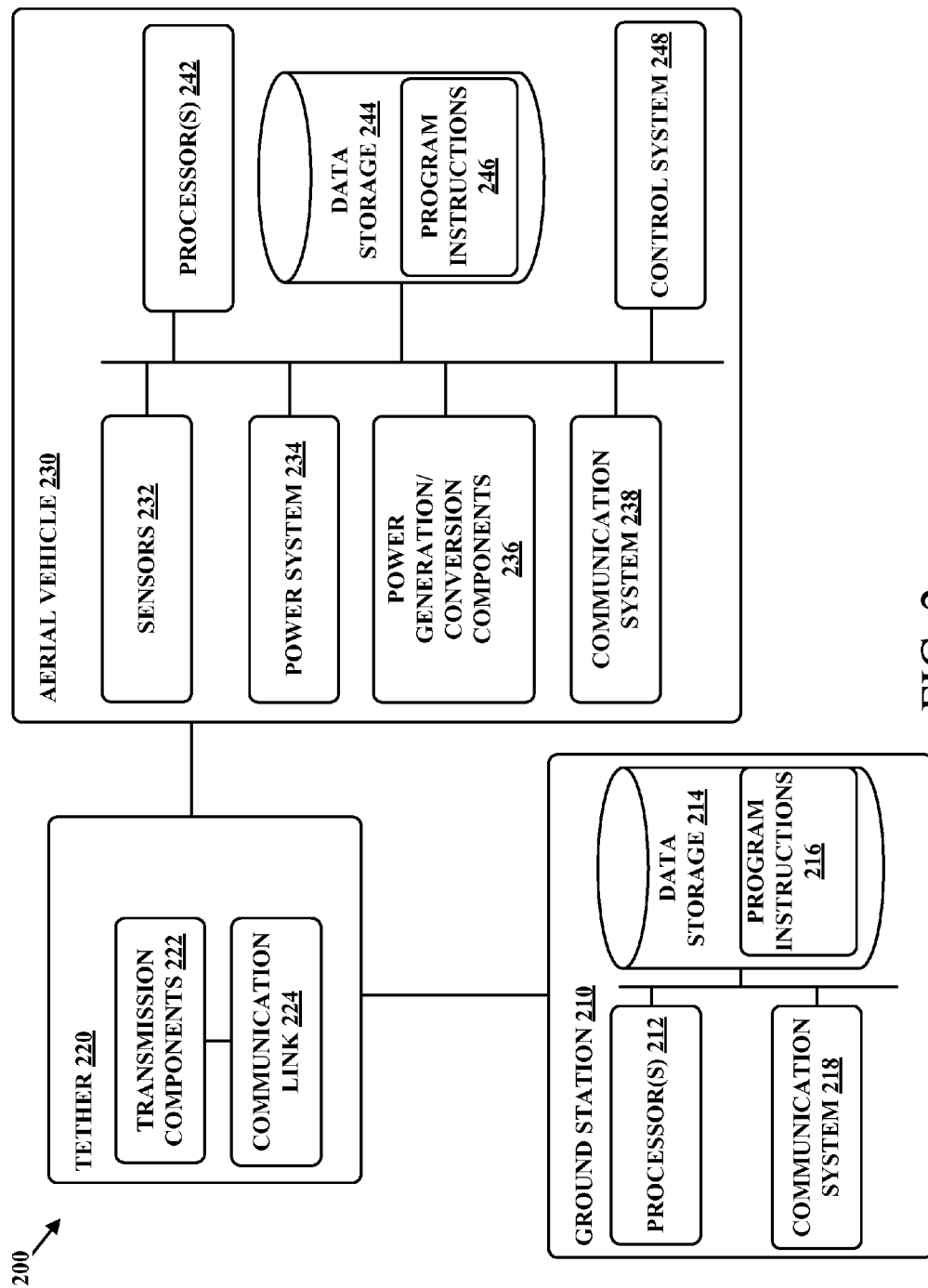
FIG. 2 is a simplified block diagram illustrating components of an AWT, according to an example embodiment.

FIG. 2 is a simplified block diagram illustrating components of the AWT 200. The AWT 100 may take the form of or be similar in form to the AWT 200. In particular, the AWT 200 includes a ground station 210, a tether 220, and an aerial vehicle 230. The ground station 110 may take the form of or be similar in form to the ground station 210, the tether 120 may take the form of or be similar in form to the tether 220, and the aerial vehicle 130 may take the form of or be similar in form to the aerial vehicle 230.

As shown in FIG. 2, the ground station 210 may include one or more processors 212, data storage 214, and program instructions 216. A processor 212 may be a general-purpose processor or a special purpose processor (e.g., digital signal processors, application specific integrated circuits, etc.). The one or more processors 212 can be configured to execute computer-readable program instructions 216 that are stored in a data storage 214 and are executable to provide at least part of the functionality described herein.

The data storage 214 may include or take the form of one or more computer-readable storage media that may be read or accessed by at least one processor 212. The one or more computer-readable storage media can include volatile and/or non-volatile storage components, such as optical, magnetic, organic or other memory or disc storage, which may be integrated in whole or in part with at least one of the one or more processors 212. In some embodiments, the data storage 214 may be implemented using a single physical device (e.g., one optical, magnetic, organic or other memory or disc storage unit), while in other embodiments, the data storage 214 can be implemented using two or more physical devices.

As noted, the data storage 214 may include computer-readable program instructions 216 and perhaps additional data, such as diagnostic data of the ground station 210. As such, the data storage 214 may include program instructions to perform or facilitate some or all of the functionality described herein.

In a further respect, the ground station 210 may include a communication system 218. The communication system 218 may include one or more wireless interfaces and/or one or more wireline interfaces, which allow the ground station 210 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. The ground station 210 may communicate with the aerial vehicle 230, other ground stations, and/or other entities (e.g., a command center) via the communication system 218.

In an example embodiment, the ground station 210 may include communication systems 218 that allows for both short-range communication and long-range communication. For example, the ground station 210 may be configured for short-range communications using Bluetooth and for long-range communications under a CDMA protocol. In such an embodiment, the ground station 210 may be configured to function as a "hot spot"; or in other words, as a gateway or proxy between a remote support device (e.g., the tether 220, the aerial vehicle 230, and other ground stations) and one or more data networks, such as cellular network and/or the Internet. Configured as such, the ground station 210 may facilitate data communications that the remote support device would otherwise be unable to perform by itself.

For example, the ground station 210 may provide a WiFi connection to the remote device, and serve as a proxy or gateway to a cellular service provider's data network, which the ground station 210 might connect to under an LTE or a 3G protocol, for instance. The ground station 210 could also serve as a proxy or gateway to other ground stations or a command center, which the remote device might not be able to otherwise access.

Moreover, as shown in FIG. 2, the tether 220 may include transmission components 222 and a communication link 224. The transmission components 222 may be configured to transmit electrical energy from the aerial vehicle 230 to the ground station 210 and/or transmit electrical energy from the ground station 210 to the aerial vehicle 230. The transmission components 222 may take various different forms in various different embodiments. For example, the transmission components 222 may include one or more conductors that are configured to transmit electricity. And in at least one such example, the one or more conductors may include aluminum and/or any other material which allows for the conduction of electric current. Moreover, in some implementations, the transmission components 222 may surround a core of the tether 220 (not shown).

The ground station 210 could communicate with the aerial vehicle 230 via the communication link 224. The communication link 224 may be bidirectional and may include one or more wired and/or wireless interfaces. Also, there could be one or more routers, switches, and/or other devices or networks making up at least a part of the communication link 224.

Further, as shown in FIG. 2, the aerial vehicle 230 may include one or more sensors 232, a power system 234, power generation/conversion components 236, a communication system 238, one or more processors 242, data storage 244, program instructions 246, and a control system 248.

The sensors 232 could include various different sensors in various different embodiments. For example, the sensors 232 may include a global positioning system (GPS) receiver. The GPS receiver may be configured to provide data that is typical of well-known GPS systems (which may be referred to as a global navigation satellite system (GNNS)), such as the GPS coordinates of the aerial vehicle 230. Such GPS data may be utilized by the AWT 200 to provide various functions described herein.

As another example, the sensors 232 may include one or more wind sensors, such as one or more pitot tubes. The one or more wind sensors may be configured to detect apparent and/or relative wind. Such wind data may be utilized by the AWT 200 to provide various functions described herein.

Still as another example, the sensors 232 may include an inertial measurement unit (IMU). The IMU may include both an accelerometer and a gyroscope, which may be used together to determine the orientation of the aerial vehicle 230. In particular, the accelerometer can measure the orientation of the aerial vehicle 230 with respect to earth, while the gyroscope measures the rate of rotation around an axis, such as a centerline of the aerial vehicle 230. IMUs are commercially available in low-cost, low-power packages. For instance, the IMU may take the form of or include a miniaturized MicroElectroMechanical System (MEMS) or a NanoElectroMechanical System (NEMS). Other types of IMUs may also be utilized. The IMU may include other sensors, in addition to accelerometers and gyroscopes, which may help to better determine position. Two examples of such sensors are magnetometers and pressure sensors. Other examples are also possible.

While an accelerometer and gyroscope may be effective at determining the orientation of the aerial vehicle 230, slight errors in measurement may compound over time and result in a more significant error. However, an example aerial vehicle 230 may be able to mitigate or reduce such errors by using a magnetometer to measure direction. One example of a magnetometer is a low-power, digital 3-axis magnetometer, which may be used to realize an orientation independent electronic compass for accurate heading information. However, other types of magnetometers may be utilized as well.

The aerial vehicle 230 may also include a pressure sensor or barometer, which can be used to determine the altitude of the aerial vehicle 230. Alternatively, other sensors, such as sonic altimeters or radar altimeters, can be used to provide an indication of altitude, which may help to improve the accuracy of and/or prevent drift of the IMU. In addition, the aerial vehicle 230 may include one or more load cells configured to detect forces distributed between a connection of the tether 220 to the aerial vehicle 230.

As noted, the aerial vehicle 230 may include the power system 234. The power system 234 could take various different forms in various different embodiments. For example, the power system 234 may include one or more batteries for providing power to the aerial vehicle 230. In some implementations, the one or more batteries may be rechargeable and each battery may be recharged via a wired connection between the battery and a power supply and/or via a wireless charging system, such as an inductive charging system that applies an external time-varying magnetic field to an internal battery and/or charging system that uses energy collected from one or more solar panels.

As another example, the power system 234 may include one or more motors or engines for providing power to the aerial vehicle 230. In some implementations, the one or more motors or engines may be powered by a fuel, such as a hydrocarbon-based fuel. And in such implementations, the fuel could be stored on the aerial vehicle 230 and delivered to the one or more motors or engines via one or more fluid conduits, such as piping. In some implementations, the power system 234 may be implemented in whole or in part on the ground station 210.

As noted, the aerial vehicle 230 may include the power generation/conversion components 236. The power generation/conversion components 236 could take various different forms in various different embodiments. For example, the power generation/conversion components 236 may include one or more generators, such as high-speed, direct-drive generators. With this arrangement, the one or more generators may be driven by one or more rotors. And in at least one such example, the one or more generators may operate at full rated power wind speeds of 11.5 meters per second at a capacity factor which may exceed 60 percent, and the one or more generators may generate electrical power from 40 kilowatts to 600 megawatts.

Moreover, as noted, the aerial vehicle 230 may include a communication system 238. The communication system 238 may take the form of or be similar in form to the communication system 218. The aerial vehicle 230 may communicate with the ground station 210, other aerial vehicles, and/or other entities (e.g., a command center) via the communication system 238.

In some implementations, the aerial vehicle 230 may be configured to function as a "hot spot"; or in other words, as a gateway or proxy between a remote support device (e.g., the ground station 210, the tether 220, other aerial vehicles) and one or more data networks, such as cellular network and/or the Internet. Configured as such, the aerial vehicle 230 may facilitate data communications that the remote support device would otherwise be unable to perform by itself.

For example, the aerial vehicle 230 may provide a WiFi connection to the remote device, and serve as a proxy or gateway to a cellular service provider's data network, which the aerial vehicle 230 might connect to under an LTE or a 3G protocol, for instance. The aerial vehicle 230 could also serve as a proxy or gateway to other aerial vehicles or a command station, which the remote device might not be able to otherwise access.

As noted, the aerial vehicle 230 may include the one or more processors 242, the program instructions 246, and the data storage 244. The one or more processors 242 can be configured to execute computer-readable program instructions 246 that are stored in the data storage 244 and are executable to provide at least part of the functionality described herein. The one or more processors 242 may take the form of or be similar in form to the one or more processors 212, the data storage 244 may take the form of or be similar in form to the data storage 214, and the program instructions 246 may take the form of or be similar in form to the program instructions 216.

Moreover, as noted, the aerial vehicle 230 may include the control system 248. In some implementations, the control system 248 may be configured to perform one or more functions described herein. The control system 248 may be implemented with mechanical systems and/or with hardware, firmware, and/or software. As one example, the control system 248 may take the form of program instructions stored on a non-transitory computer readable medium and a processor that executes the instructions. The control system 248 may be implemented in whole or in part on the aerial vehicle 230 and/or at least one entity remotely located from the aerial vehicle 230, such as the ground station 210. Generally, the manner in which the control system 248 is implemented may vary, depending upon the particular application.

While the aerial vehicle 230 has been described above, it should be understood that the methods and systems described herein could involve any suitable aerial vehicle that is connected to a tether, such as the tether 220 and/or the tether 120.

C. Illustrative Aerial Vehicle

Figure 3:
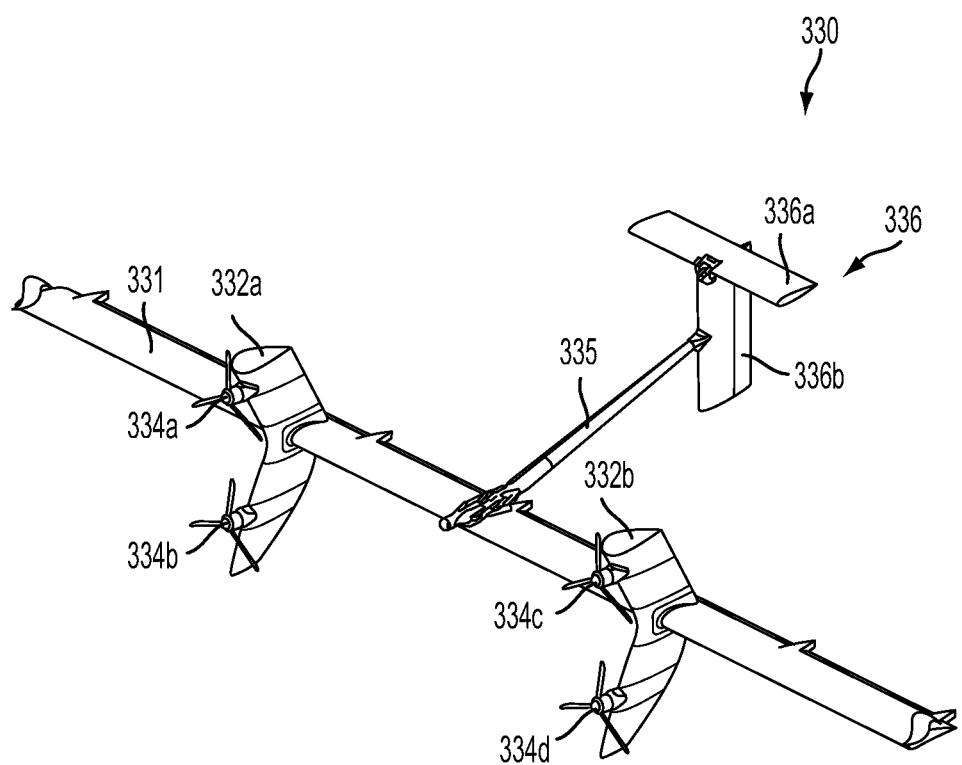
FIG. 3 depicts an aerial vehicle, according to an example embodiment.

FIG. 3 depicts an aerial vehicle 330, according to an example embodiment. The aerial vehicle 130 and/or the aerial vehicle 230 may take the form of or be similar in form to the aerial vehicle 330. In particular, the aerial vehicle 330 may include a main wing 331, pylons 332a, 332b, rotors 334a, 334b, 334c, 334d, a tail boom 335, and a tail wing assembly 336. Any of these components may be shaped in any form which allows for the use of components of lift to resist gravity and/or move the aerial vehicle 330 forward.

The main wing 331 may provide a primary lift force for the aerial vehicle 330. The main wing 331 may be one or more rigid or flexible airfoils, and may include various control surfaces, such as winglets, flaps (e.g., Fowler flaps, Hoerner flaps, split flaps, and the like), rudders, elevators, spoilers, dive brakes, etc. The control surfaces may be used to stabilize the aerial vehicle 330 and/or reduce drag on the aerial vehicle 330 during hover flight, forward flight, and/or crosswind flight.

The main wing 331 and pylons 332a, 332b may be any suitable material for the aerial vehicle 330 to engage in hover flight, forward flight, and/or crosswind flight. For example, the main wing 331 and pylons 332a, 332b may include carbon fiber and/or e-glass, and include internal supporting spars or other structures. Moreover, the main wing 331 and pylons 332a, 332b may have a variety of dimensions. For example, the main wing 331 may have one or more dimensions that correspond with a conventional wind turbine blade. As another example, the main wing 331 may have a span of 8 meters, an area of 4 meters squared, and an aspect ratio of 15.

The pylons 332a, 332b may connect the rotors 334a, 334b, 334c, and 334d to the main wing 331. In some examples, the pylons 332a, 332b may take the form of, or be similar in form to, a lifting body airfoil (e.g., a wing). In some examples, a vertical spacing between corresponding rotors (e.g., rotor 334a and rotor 334b on pylon 332a) may be 0.9 meters.

The rotors 334a, 334b, 334c, and 334d may be configured to drive one or more generators for the purpose of generating electrical energy. In this example, the rotors 334a, 334b, 334c, and 334d may each include one or more blades, such as three blades or four blades. The rotor blades may rotate via interactions with the wind and be used to drive the one or more generators. In addition, the rotors 334a, 334b, 334c, and 334d may also be configured to provide thrust to the aerial vehicle 330 during flight. With this arrangement, the rotors 334a, 334b, 334c, and 334d may function as one or more propulsion units, such as a propeller. Although the rotors 334a, 334b, 334c, and 334d are depicted as four rotors in this example, in other examples the aerial vehicle 330 may include any number of rotors, such as less than four rotors or more than four rotors (e.g., eight rotors).

A tail boom 335 may connect the main wing 331 to the tail wing assembly 336, which may include a tail wing 336a and a vertical stabilizer 336b. The tail boom 335 may have a variety of dimensions. For example, the tail boom 335 may have a length of 2 meters. Moreover, in some implementations, the tail boom 335 could take the form of a body and/or fuselage of the aerial vehicle 330. In such implementations, the tail boom 335 may carry a payload.

The tail wing 336a and/or the vertical stabilizer 336b may be used to stabilize the aerial vehicle 330 and/or reduce drag on the aerial vehicle 330 during hover flight, forward flight, and/or crosswind flight. For example, the tail wing 336a and/or the vertical stabilizer 336b may be used to maintain a pitch of the aerial vehicle 330 during hover flight, forward flight, and/or crosswind flight. The tail wing 336a and the vertical stabilizer 336b may have a variety of dimensions. For example, the tail wing 336a may have a length of 2 meters. Moreover, in some examples, the tail wing 336a may have a surface area of 0.45 meters squared. Further, in some examples, the tail wing 336a may be located 1 meter above a center of mass of the aerial vehicle 330.

While the aerial vehicle 330 has been described above, it should be understood that the systems and methods described herein could involve any suitable aerial vehicle that is connected to an airborne wind turbine tether, such as the tether 120 and/or the tether 220.

D. Illustrative Tether Twist

Figure 4C:
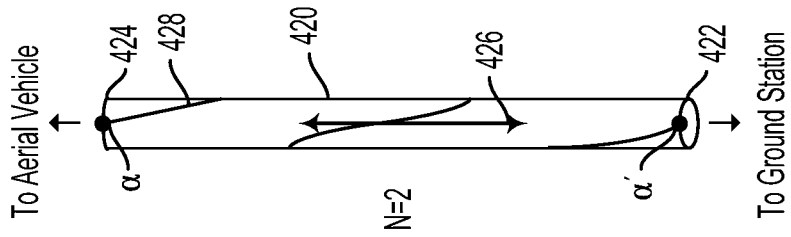
FIGS. 4a-c illustrate twist in a tether, according to an example embodiment.
Figure 4B:
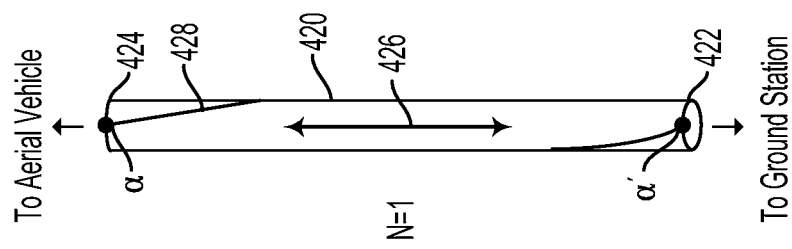
Figure 4A:
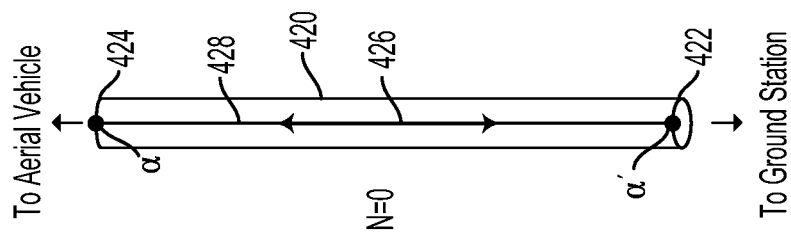

FIGS. 4a-c depict twist in a tether 420, according to an example embodiment. The tether 120 and/or the tether 220 may take the form of or be similar in form to the tether 420. Referring to FIG. 4a, the tether 420 includes a proximate tether end 422, a distal tether end 424, and a long axis 426 is defined as extending between the proximate tether end 422 and the distal tether end 424. In the illustrated example, the distal tether end 424 may be coupled to an aerial vehicle (not shown), such as the aerial vehicle 330. The proximate tether end 422 may be coupled to a ground station (not shown), such as the ground station 110 and/or the ground station 210. In addition, the tether 420 may include at least one insulated electrical conductor (not shown) coupled to the aerial vehicle. In some embodiments, the tether 420 may include a core (not shown), and a return path of the at least one insulated electrical conductor may include conduction down the core. Moreover, in such embodiments, the core may include carbon. Further, in some embodiments, a return path of the at least one insulated electrical conductor may include free-body capacitance.

FIGS. 4a-c, and remaining Figures depicting tethers, are for illustrative purposes only and may not reflect all components or connections. Further, as illustrations the Figures may not reflect actual operating conditions, but are merely to illustrate embodiments described. For example, while a straight cylinder may be used to illustrate the described tether embodiments, during orbiting crosswind flight the tether may in practice exhibit some level of droop between the ground station and the aerial vehicle. Further still, the relative dimensions in the Figures may not be to scale, but are merely to illustrate the embodiments described.

FIGS. 4a-c illustrate twist in the tether 420 between the proximate tether end 422 and the distal tether end 424 as the aerial vehicle 330 travels along a closed path, such as the closed path 150. In some embodiments, an amount of twist in the tether 420 may be measured as an angular distance between a point α on the tether 420 at the distal tether end 424 and a point α' on the tether 420 at the proximate tether end 422. Other measurement points are also possible. For example, an amount of twist may be at two or more points located between the distal tether end 424 and the proximate tether end 422. As shown in FIGS. 4a-c, an amount of twist in the tether 420 may increase as the number of revolutions (N) of the closed path that the aerial vehicle 330 has traveled along increases.

For example, as shown in FIG. 4a, prior to the aerial vehicle starting crosswind orbits the vehicle may not have started any revolutions along a closed path (N=0) and therefore the tether may not have experienced any rotations. Accordingly, an illustrative reference line 428 on the tether 420 that extends between the point α and the point α' may be substantially parallel to the long axis 426 of the tether. With this arrangement, the amount of twist in the tether 420 may be substantially zero and the angular distance between the point α and the point α' may be substantially zero.

The term "substantially parallel," as used in the disclosure, refers to exactly parallel or one or more deviations from exactly parallel that do not significantly impact controlling rotation and twist of a tether as described herein. In addition, the term "substantially zero," as used in this disclosure, refers to exactly zero or one or more deviations from exactly zero that do not significantly impact controlling rotation and twist of a tether as described herein.

As shown in FIG. 4b, after the aerial vehicle 330 completes one orbit, and thus N=1, the tether 420 may twist about the long axis 426 to the extent that the proximate tether end 422 does not rotate while the distal tether end 424 is rotated by the orbit of the vehicle. Thus reference line 428 may form a helix around the long axis 426. With this arrangement, when N=1, the angular distance between the point α and the point α' may be greater than the angular distance between the point α and the point α' when N=0. Accordingly, when N=1, an amount of twist in the tether 420 may be greater than an amount of twist in the tether 420 when N=0.

Further, as shown in FIG. 4c, after the aerial vehicle 330 completes two orbits, and thus N=2, the tether 420 may further twist about the long axis 426. In the illustrated example, the helical pitch of reference line 428 may be greater than the helical pitch of the reference line 428 in FIG. 4b. With this arrangement, when N=2, the angular distance between the point α and the point α' may be greater than the angular distance between the point α and the point α' when N=1. Accordingly, when N=2, an amount of twist in the tether 420 may be greater than an amount of twist in the tether 420 when N=1.

E. Aerial Vehicle Coupled to a Ground Station via a Tether

Figure 5:
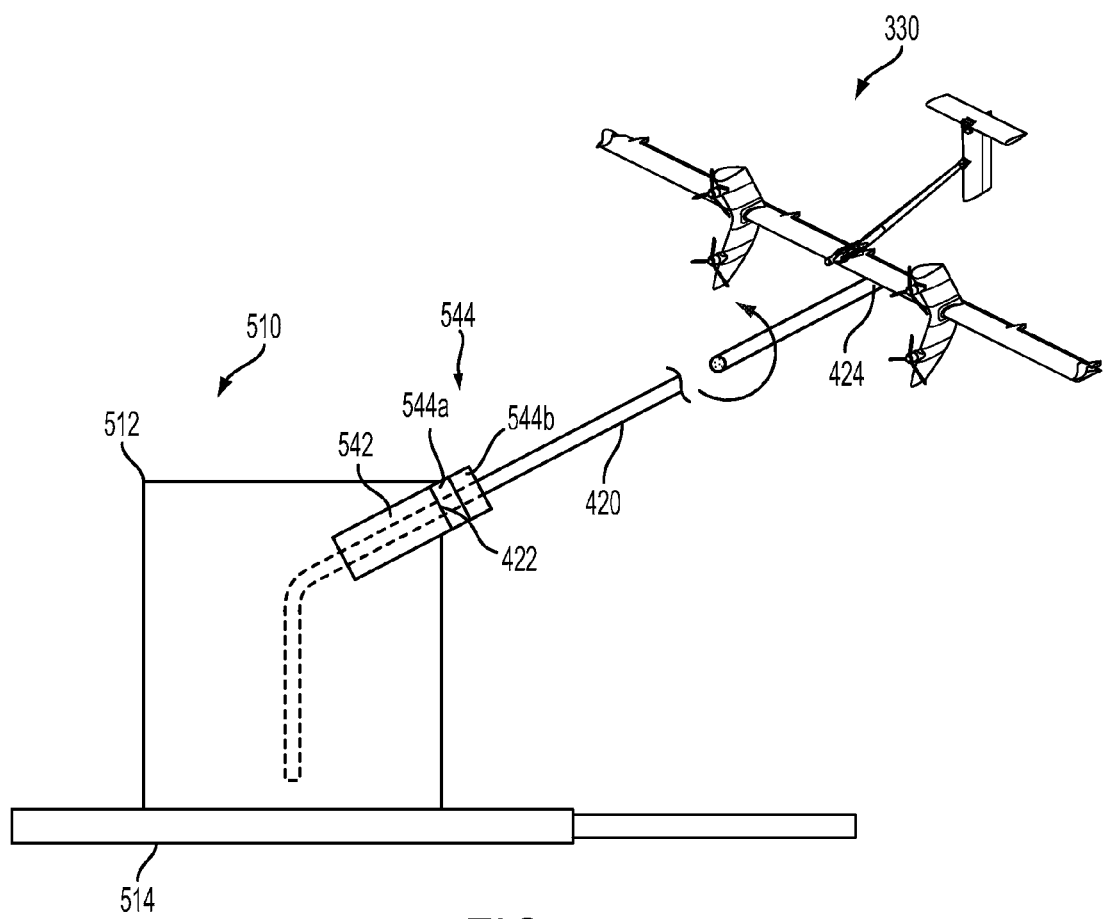
FIG. 5 depicts an aerial vehicle coupled to a ground station via a tether, according to an example embodiment.

FIG. 5 depicts the aerial vehicle 330 coupled to a ground station 510 via the tether 420, according to an example embodiment. Referring to FIG. 5, the ground station 510 may include a winch drum 512 and a platform 514. The ground station 110 and/or the ground station 210 may take the form of or be similar in form to the ground station 510. FIG. 5 is for illustrative purposes only and may not reflect all components or connections.

As shown in FIG. 5, the tether 420 may be coupled to a tether gimbal assembly 542 at the proximate tether end 422 and to the aerial vehicle 330 at the distal tether end 424. Additionally or alternatively, at least a portion of the tether 420 (e.g., the at least one insulated electrical conductor) may pass through the tether gimbal assembly 542. In some embodiments, the tether 420 may terminate at the tether gimbal assembly 542. Moreover, as shown in FIG. 5, the tether gimbal assembly 542 may also be coupled to the winch drum 512 which in turn may be coupled to the platform 514. In some embodiments, the tether gimbal assembly 542 may be configured to rotate about one or more axes, such as an altitude axis and an azimuth axis, in order to allow the proximate tether end 422 to move in those axes in response to movement of the aerial vehicle 330.

A rotational component 544 located between the tether 420 and the tether gimbal assembly 542 may allow the tether 420 to rotate about the long axis 426 of the tether 420 (as shown in, and described with respect to, FIGS. 4a-c). In some embodiments, at least a portion of the tether 420 may pass through the rotational component 544. Moreover, in some embodiments, the tether 420 may pass through the rotational component 544. Further, in some embodiments, the rotational component 544 may include a fixed portion 544a and a rotatable portion 544b, for example, in the form of one or more bearings and/or slip rings. The fixed portion 544a may be coupled to the tether gimbal assembly 542. The rotatable portion 544b may be coupled to the tether 420.

The use of the word fixed in the fixed portion 544a of the rotational component 544 is not intended to limit fixed portion 544a to a stationary configuration. In this example, the fixed portion 544a may move in axes described by the tether gimbal assembly 542 (e.g., altitude and azimuth), and may rotate about the ground station 510 as the winch drum 512 rotates, but the fixed portion 544a will not rotate about the tether 420, i.e., with respect to the long axis 426 of the tether. Moreover, in this example, the rotatable portion 544b of the rotational component 544 may be coupled to the tether 420 and configured to substantially rotate with the rotation of tether 420.

Via the rotational component 544, the tether 420 may rotate about its centerline along the long axis 426 as the aerial vehicle 330 orbits. The distal tether end 424 may rotate a different amount than the proximate tether end 422, resulting in an amount of twist along the length of the tether 420. With this arrangement, the amount of twist in the tether 420 may vary based on a number of parameters during crosswind flight of the aerial vehicle 330.

F. Systems for Controlling Rotation and Twist of a Tether

FIG. 6a depicts a system 600 for controlling rotation and twist in the tether 420, according to an example embodiment. In particular, the system 600 includes a drive mechanism 650 and a control system 660. Referring to FIG. 6a, the tether 420 may be coupled to a tether gimbal assembly 542 at the proximate tether end 422 and to the aerial vehicle 330 at the distal tether end 424. Additionally or alternatively, at least a portion of the tether 420 may pass through the tether gimbal assembly 542. In some embodiments, the tether 420 may terminate at the tether gimbal assembly 542. The tether gimbal assembly 542 may be coupled to the winch drum 512 which in turn may be coupled to the platform 514. For example, the tether 420, the tether gimbal assembly 542 connections, as well as other connections, may be as described with respect to FIG. 5.

The drive mechanism 650 may be coupled to the tether gimbal assembly 542, and the tether 420 may pass through the drive mechanism 650. In some embodiments, the drive mechanism 650 may include a motor (e.g., a servo motor) and a bearing. The drive mechanism 650 may actively rotate the tether 420 about its centerline along the long axis 426 via a direct connection to the tether, or via rotation of a component coupled to the tether 420. The distal tether end 424 may rotate a different amount than the proximate tether end 422, resulting in an amount of twist along the length of the tether 420. With this arrangement, the amount of twist in the tether 420 may vary based on a number of parameters during crosswind flight of the aerial vehicle 330.

The control system 660 is configured to control operation(s) of the system 600 and its components. In some embodiments, the control system 660 may be configured to perform one or more functions described herein. For example, in some embodiments, the control system 660 may be configured to operate the drive mechanism 650 to control twist in the tether 420. In the illustrated embodiment, the control system 660 is connected to at least the drive mechanism 650 by a connection 662, though other alternative or additional connections are possible, including but not limited to the tether 420 and the aerial vehicle 330. With this arrangement, an amount of twist in the tether 420 during crosswind flight of the aerial vehicle 330 may be actively controlled. In some examples, the connection 662 may include a wired connection or a wireless connection.

The control system 660 may be similar in form to the control system 248. For instance, the control system 660 may be implemented with mechanical systems and/or with hardware, firmware, and/or software. As one example, the control system 660 may take the form of program instructions stored on a non-transitory computer readable medium and a processor that executes the instructions. The control system 660 may be implemented in whole or in part on the ground station 510 and/or at least one entity remotely located from the ground station, such as the aerial vehicle 330. Generally, the manner in which the control system 660 is implemented may vary, depending upon the particular application.

The control system 660 may be configured to operate the drive mechanism 650 to control the amount of twist in the tether 420. FIG. 6b depicts a foreshortened view of the tether 420, where an amount of twist T in the tether 420 is defined as an angular distance between two points along the length of the tether 420. In the example shown, the points a' and a are at the proximate and distal tether ends 422, 424, respectively, though the points may be elsewhere in other embodiments.

In some cases, it may be desirable for the twist in the tether 420 to be positive. This may be accomplished by maintaining a rate of rotation in the proximate tether end 422 via the drive mechanism 650 such that the proximate tether end 422 is twisted a fixed or variable amount towards the direction of aerial vehicle 330 orbit beyond a natural state of the tether 420 (for example, when no torque or tension is applied via a drive mechanism and the proximate tether end 422 is allowed to rotate freely via a free-running rotational component). This may be referred to as a lead mode. In such embodiments, the control system 660 may be configured to operate the drive mechanism 650 in the lead mode.

Further still, in some embodiments, it may be desirable for the twist in the tether 420 to be negative. FIG. 6b, as shown, may be illustrative of a tether with a negative twist if the aerial vehicle is orbiting counter-clockwise. Negative twist may be accomplished by maintaining a rate of rotation in the proximate tether end 422 via the drive mechanism 650 such that the proximate tether end 422 is twisted a fixed or variable amount away from the direction of rotation, although the proximate tether end 422 may still be rotating in the direction of the aerial vehicle 330 orbit. This may referred to as a lag mode. In such embodiments, the control system 660 may be configured to operate the drive mechanism 650 in the lag mode. Moreover, in some embodiments, it may be desirable for the twist in the tether 420 to be substantially zero.

In addition, in some embodiments, the control system 660 may be configured to operate the drive mechanism 650 at variable speeds, fixed speeds, or in an on/off fashion in order to maintain the desired twist within a certain operating range. For example, the control system 660 may be configured to maintain the tether 420 twist within a range of values by activating and deactivating the drive mechanism 650 (e.g., pulsing a drive motor coupled to the tether 420). As another example, the control system 660 may be configured to maintain the tether 420 twist within a range of values by causing the drive mechanism 650 to rotate at a constant rate. As yet another example, the control system 650 may be configured to maintain the tether 420 twist within a range of values by causing the drive mechanism 650 to rotate at a variable rate. In such examples, the variable rate may be determined in reference to at least the rotational rate of the tether 420. For instance, in at least one such example, the variable rate may be determined in reference to at least the rotational rate of the distal tether end 424 or a rotational speed of the aerial vehicle 330. Further, in at least one such example, the variable rate may be determined in reference to at least the rotational rate of the proximate tether end 422.

Moreover, in some embodiments, the control system 660 may be configured to determine one or more operational or environmental parameters that affect an AWT, such as AWT 100 and/or AWT 200, and then control the amount of twist in the tether 420 based at least in part on the determined parameter. As examples, the parameters may include tether 420 tension, position of the aerial vehicle 330, load(s) on the aerial vehicle 330, velocities of the aerial vehicle 330, wind speed(s), temperature of a tether 420 conductor, environmental temperature, conductor resistance, and/or current flowing in a conductor. For example, by increasing or decreasing the twist in the tether 420, tension in the tether 420 can be increased or decreased. And in at least one such embodiment, when the tether 420 includes two or more layers, it may desirable to maintain a relative tension between the layers of the tether 420. The control system 660 may determine the parameters at least in part by information provided by any of the sensors 232 of the aerial vehicle 230. In some embodiments, the lead mode may be based at least in part on the determined parameters. With this arrangement, the lead mode may be coupled to the tether 420 tension, position of the aerial vehicle 330, load(s) on the aerial vehicle 330, velocities of the aerial vehicle 330, wind speed(s), temperature of a tether 420 conductor, environmental temperature, conductor resistance, and/or current flowing in a conductor. Moreover, in some embodiments, the lag mode may be based at least in part on the determined parameters. With this arrangement, the lag mode may be coupled to the tether 420 tension, position of the aerial vehicle 330, load(s) on the aerial vehicle 330, velocities of the aerial vehicle 330, wind speed(s), temperature of a tether 420 conductor, environmental temperature, conductor resistance, and/or current flowing in a conductor.

Although in system 600 the drive mechanism 650 may be coupled to the tether gimbal assembly 542, in other example systems the drive mechanism 650 may be coupled instead to the aerial vehicle 330. For instance, in some embodiments, the drive mechanism 650 may be coupled to the aerial vehicle 330 and the distal tether end 424.

Figure 7:
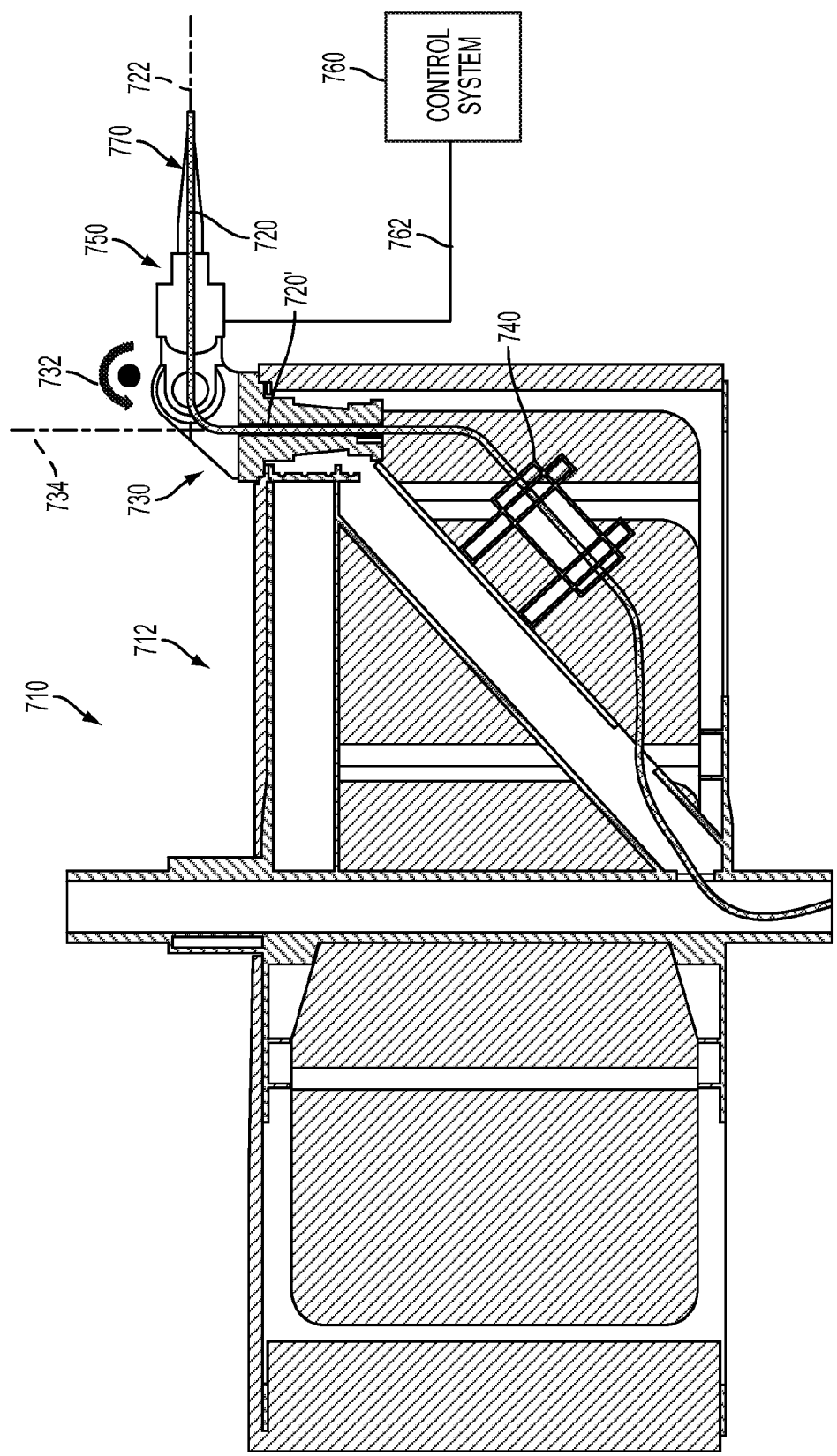
FIG. 7 depicts a system for controlling rotation and twist of a tether, according to an example embodiment.

FIG. 7 depicts a system 700 for controlling rotation and twist in a tether 720, according to an example embodiment. Referring to FIG. 7, the system 700 includes a ground station 710 (not shown complete), a winch drum 712, the tether 720, a tether gimbal assembly 730, a slip ring 740, a drive mechanism 750, a control system 760, and a tether termination 770. FIG. 7 is for illustrative purposes only and may not reflect all components or connections.

As shown in FIG. 7, the tether gimbal assembly 730 may be coupled to the winch drum 712. In some embodiments, the tether gimbal assembly 730 may be configured to rotate about one or more axes, including an altitude axis 732 and an azimuth axis 734. The altitude axis 732 may be directed out of the page (as indicated by the counterclockwise arrow). In some embodiments, at least a portion of the tether 720 may pass through the tether gimbal assembly 730. Moreover, in some embodiments, the tether 720 may terminate at the tether gimbal assembly 730. In some examples, member 720' may be a portion of the tether 720. Moreover, in some examples, the member 720' may be one or more cables (or wires) connected to the tether 720. The tether 720 may include a long axis 722 and at least one conductor (not shown).

Moreover, the member 720' may be coupled to the slip ring 740, and the slip ring 740 may be coupled to the winch drum 712, or alternatively some other part of ground station 710 (not shown). Further, in some embodiments, the slip ring 740 may be coupled to the ground. The slip ring 740 may include a fixed portion, a rotatable portion, and one or more insulated electrically conductive pathways. The one or more insulated electrically conductive pathways may provide an electrical connection between the member 720' and one or more ground-side electrical connections.

The drive mechanism 750 may be coupled to the tether gimbal assembly 730, and the tether 720 may pass through the drive mechanism 750. Via the drive mechanism 750, the tether 720 may rotate about its centerline along the long axis 722. The drive mechanism 750 may take the form of or be similar in form to the drive mechanism 650.

Further still, the drive mechanism 750 may be coupled to the control system 760 by a connection 762. The control system 760 may be configured to operate the drive mechanism 750 to control twist in the tether 720 in the same or similar way as the control system 660. The control system 760 may take the form of or be similar in form to the control system 660, and the connection 762 may take the form of or be similar in form to the connection 662. In some embodiments, the control system 760 may be coupled to another component of the system 700, including the ground station 710 and/or the tether gimbal assembly 730.

Moreover, the tether termination 770 may be coupled to the drive mechanism 750, and the tether 720 may pass through the tether termination 770. With this arrangement, the drive mechanism 750 may rotate the tether termination 770 about the long axis 722 of the tether 720.

As illustrated in FIG. 7, the winch drum 712 may include various structural components (e.g., beams, braces, brackets, plates, etc.) to support components of the system 700, including at least a portion of the tether 720, the member 720', the tether gimbal assembly 730, the slip ring 740, the drive mechanism 750, the control system 760, and/or the tether termination 770. Further, in some embodiments, the tether 720 may be coupled to the aerial vehicle 330. However, in other embodiments, the tether 720 may be coupled to other vehicles and/or other loads. And in at least one such embodiment, the other vehicles and/or other loads may travel along a closed path.

Although in system 700 the member 720' may be coupled to the slip ring 740, in other example systems the tether 720 or the member 720' may be coupled to at least one ground-side electrical connection by capacitive coupling or inductive coupling. Moreover, in some example systems, the tether 720 or the member 720' may be coupled to at least one ground-side electrical connection through a device that creates alternating current or alternating energy storage.

G. Illustrative Drive Mechanisms

Figure 8:
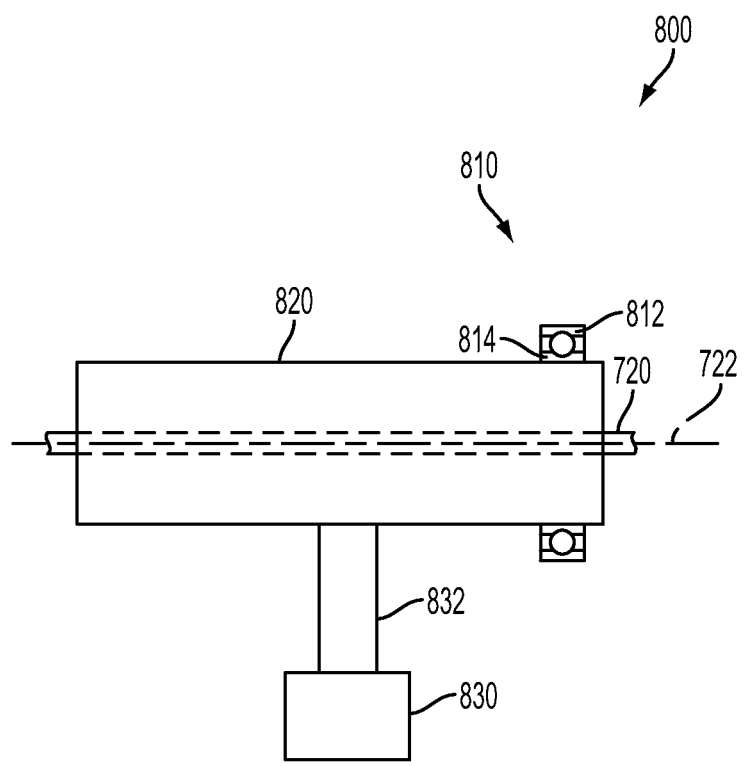
FIG. 8 depicts a drive mechanism, according to an example embodiment.

FIG. 8 depicts a drive mechanism 800, according to an example embodiment. The drive mechanism 650 and/or the drive mechanism 750 may take the form of or be similar to the drive mechanism 800. The drive mechanism 800 includes a bearing 810, a spindle 820, and a motor 830. The bearing 810 includes a fixed portion 812 and a rotatable portion 814. As shown in FIG. 8, the spindle 820 may be coupled to the rotatable portion of the bearing 810, and the tether 720 may pass through the spindle 820. With this arrangement, the tether 720 may be coupled to the spindle 820 and may rotate in conjunction with the spindle 820.

Further, the motor 830 may be coupled to the spindle 820 by one or more components 832 and configured to rotate the spindle 820 relative to the fixed portion 812 of the bearing 810. With this arrangement, the motor 830 may be configured to rotate the spindle 820 (and consequently the portion of the tether 720 that passes through the spindle 820) about the long axis 722 of the tether 720. In some embodiments, the motor 830 rotating the spindle 820 and tether 720 may reduce a load on the bearing 810 and/or wear on the bearing 810 compared to when the tether 720 passively rotates the bearing 810 during crosswind flight.

In some embodiments, the control system 760 may be coupled to the motor 830 and configured to operate the motor 830 to control a twist in the tether 720. For instance, in some embodiments, the control system 760 may be configured to operate the motor 830 to cause the drive mechanism 800 to operate in the lead mode described with reference to FIG. 6b. Moreover, in some embodiments, the control system 760 may be configured to operate the motor 830 to cause the drive mechanism to operate in the lag mode described with reference to FIG. 6b.

Further, in some embodiments, the control system 760 may be configured to operate the motor 830 at variable speeds, fixed speeds, or in an on/off fashion in order to maintain the desired twist in the tether 720 within a certain operating range. For example, the control system 760 may be configured to maintain the tether 720 twist within a range of values by activating and deactivating the motor 830 (e.g., pulsing the motor 830). As another example, the control system 760 may be configured to maintain the tether 720 twist within a range of values by causing the motor 830 to rotate at a constant rate. As yet another example, the control system 760 may be configured to maintain the tether 720 twist within a range of values by causing the motor 830 to rotate at a variable rate. In such examples, the variable rate may be determined in reference to at least the rotational rate of the tether 720.

The motor 830 and the spindle 820 may be arranged in a variety of ways. For instance, in some embodiments, the motor 830 may be offset from the spindle 820. Alternatively, in some embodiments, the motor 830 may be coaxial with the spindle 820.

Figure 9A:
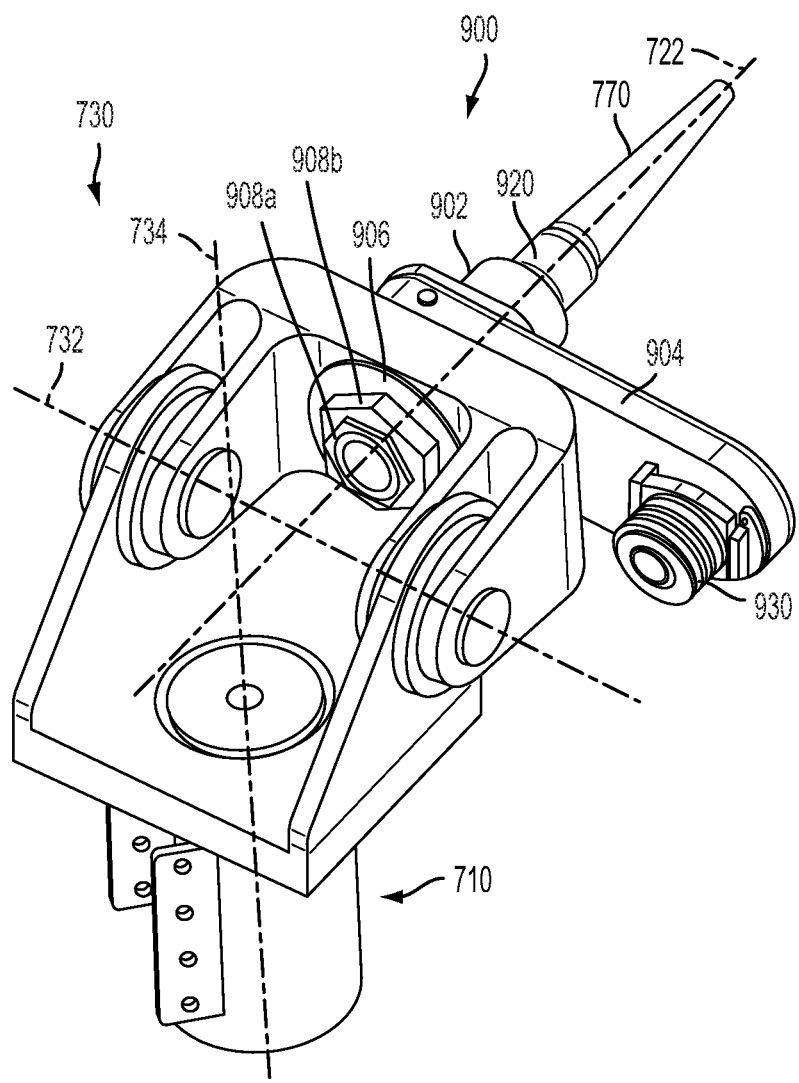
FIG. 9a depicts a drive mechanism coupled to a tether gimbal assembly and a tether termination, according to an example embodiment.
Figure 9B:
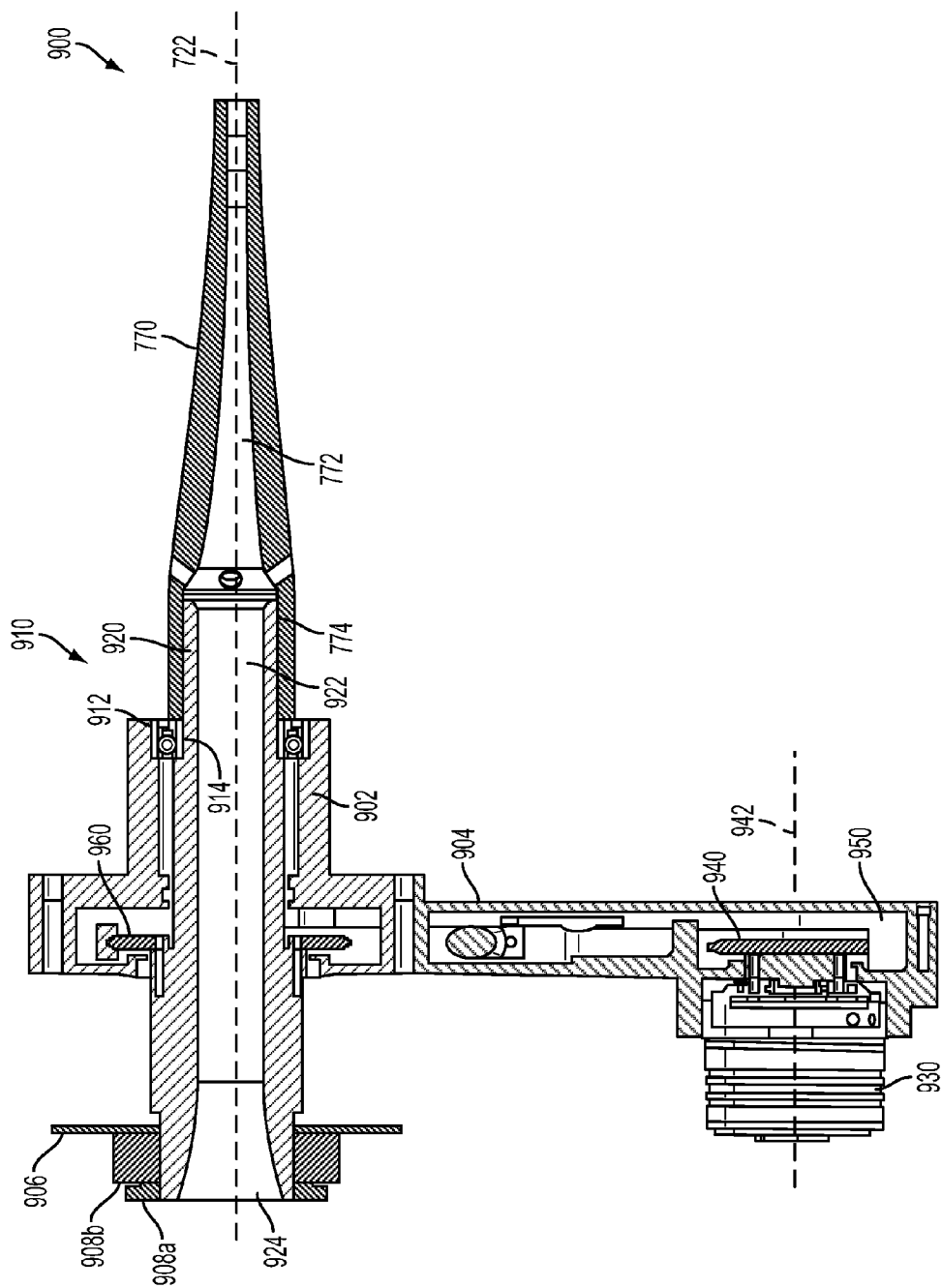
FIG. 9b depicts a drive mechanism in cross-section coupled to a tether termination, according to an example embodiment.

FIGS. 9a and 9b depict a drive mechanism 900, according to an example embodiment. The drive mechanism 650, the drive mechanism 750, and/or the drive mechanism 800 may take the form of or be similar in form to the drive mechanism 900. In particular, FIG. 9a depicts the drive mechanism 900 coupled to the tether gimbal assembly 730 and the tether termination 770, and FIG. 9b depicts a view of the drive mechanism 900 in cross-section coupled to the tether termination 770.

Referring to FIG. 9a, the drive mechanism 900 includes a stinger 902, a housing 904, a plate 906, a first spindle nut 908a, a second spindle nut 908b, a spindle 920, and a motor 930. As shown in FIG. 9a, the spindle 920 may be coupled to the tether termination mount 770 and the stinger 902. Further, the tether 720 may be coupled to the spindle 920. Further still, the spindle 920 may pass through the housing 904 and be coupled to the plate 906. The stinger 902 in turn may be coupled to the housing 904. In some embodiments, the stinger 902 may be coupled to the housing 904 by a welded connection. The plate 906 may be coupled to the tether gimbal assembly 730 via the first spindle nut 908a and the second spindle nut 908b. With this arrangement, the housing 904 may be fixed to the tether gimbal assembly 730, and the spindle 920 may be rotatably coupled to the housing 904. In some embodiments, the housing 904 may be referred to as a case.

Further, the motor 930 may be coupled to the housing 904. In some embodiments, the motor 930 may be coupled to the control system 760 (not shown) in the same or similar way as the motor 830 is coupled to the control system 760. Moreover, in some embodiments, the control system 760 may be configured to operate the motor 930 to control a twist in the tether 720 in the same or similar way as the control system 760 may be configured to operate the motor 830 to control a twist in the tether 720. In the drive mechanism 900, the motor 930 may be offset from the spindle 920.

The stinger 902, the housing 904, the plate 906, the first spindle nut 908a, the second spindle nut 908b, and the spindle 920 may comprise a variety of materials. For instance, in some embodiments, the stinger 902, housing 904, and/or the plate 906 may comprise a metal, such as an alloy of aluminum. And in at least one such embodiment, the stinger 902, housing 904, and/or the plate 906 may comprise Series 6061 T6 aluminum. Moreover, in some embodiments, the first spindle nut 908a, the second spindle nut 908b, and/or the spindle 920 may comprise a stainless steel. And in at least one embodiment, the first spindle nut 908a, the second spindle nut 908b, and/or spindle 920 may comprise 17-4PH H900 stainless steel available from AK Steel. In addition, in some examples, the first spindle nut 908a and/or the second spindle nut 908b may further comprise hard chrome plating. At least one dimension or parameter of the stinger 902, the housing 904, the first spindle nut 908a, the second spindle nut 908b, and the spindle 920 may be selected based on a variety of parameters, including at least one dimension of the tether 720 (e.g., diameter) and/or loading of the tether 720. For instance, a bearing diameter, runout, roundness, straightness, and/or surface finish of the spindle 920 may be selected based on the at least one dimension of the tether 720 and/or loading of the tether 720. Further, in some embodiments, the spindle 920 may be designed for a service life comprising a certain time period, such as 10 years. Further still, in some embodiments, the spindle 920 may be designed to withstand a load, for example, between 100 kilonewtons (kN) and 280 kN. In addition, the plate 906 may be designed to withstand a load, for example, of 280 kN.

Referring to FIG. 9b, the drive mechanism 900 includes a bearing 910, a drive component 940, at least one coupling component 950, and a driven component 960. In addition, the spindle 920 includes a first bore 922 and a nozzle 924, and the tether termination 770 includes a second bore 772.

The tether 720 may pass through the first bore 922 of the spindle 920 and the nozzle 924 of the spindle 920. In some embodiments, at least one dimension of the first bore 922 and/or at least one dimension of the nozzle 924 may be selected based on at least one dimension of the tether 720 and/or loading on the tether 720. When the tether 720 passes through the first bore 922 of the spindle 920, the long axis of the tether 722 may correspond with a centerline of the spindle 920.

As shown in FIG. 9b, the bearing 910 includes a fixed portion 912 and a rotatable portion 914. The fixed portion 912 of the bearing 910 may be coupled to the stinger 902. With this arrangement, in some embodiments, the fixed portion 912 of the bearing 910 may be coupled to the tether gimbal assembly 730. The spindle 920 may be coupled to the rotatable portion 914 of the bearing 910 and may be rotatable relative to the fixed portion 912 of the bearing 910. Additional bearings may support the spindle 920 during rotation. For instance, in some embodiments, a rear bearing assembly may rotatably couple the spindle 920 to the tether gimbal assembly 730. And in at least one such embodiment, the tether gimbal assembly 730 may include the rear bearing assembly.

The bearing 910 may take various different forms in various different embodiments. For instance, in some embodiments, the bearing 910 may include a spherical thrust roller bearing. Moreover, in some embodiments, the bearing 910 may include at least one 200 millimeter (mm) roller element. Further, in some embodiments, the bearing 910 may include SFK 6013-2RS1 bearing available from SFK. At least one dimension of the bearing 910 (e.g., inner diameter of the rotatable portion 914) may be selected based on at least one dimension of the spindle 920 (e.g., diameter) and/or loading of the tether 720. Further, in some embodiments, the bearing 910 may be designed for a service life comprising a certain time period, such as 10 years. Further, in some embodiments, the bearing 910 may include a thrust ball bearing. Further still, in some embodiments, the bearing 910 may include a bearing stack.

The motor 930 may be coupled to the spindle 920 by the drive component 940, the at least one coupling component 950, and the driven component 960. For instance, as shown in FIG. 9b, the motor 930 is coupled to the drive component 940 and may be configured to rotate the drive component 940. In some embodiments, the motor 930 may be configured to rotate the drive component 940 about an axis 942 substantially parallel to the long axis 722 of the tether 720. The drive component 940 may include, for example, one or more sprockets, pulleys, and/or gears.

Further, as shown in FIG. 9b, the drive component 940 is coupled to the driven component 960 and may be configured to rotate the driven component 960. In some embodiments, the drive component 940 may be configured to rotate the driven component 960 about the long axis 722 of the tether 720. The driven component 960 may include, for example, one or more sprockets, pulleys, and/or gears.

Further still, as shown FIG. 9b, the drive component 940 is coupled to the driven component 960 by the at least one coupling component 950. Further still, as shown in FIG. 9b, the driven component 960 is coupled to the spindle 920 and configured to rotate the spindle 920. In some embodiments, the driven component 960 may be configured to rotate the spindle 920 about the long axis of the tether 722 (and consequently the centerline of the spindle 920). The at least one coupling component 950 may include, for example, one or more chains, belts (e.g., timing belts, V-shaped belts, etc.), and/or gears. In the illustrated example, the drive component 940 and the driven component 960 may be located in the same plane. With this arrangement, the drive component 940 may be coplanar with the driven component 960.

Moreover, as shown in FIG. 9b, the spindle 920 is coupled to the tether termination 770 by a connection 774. With this arrangement, when the spindle 920 rotates about the long axis 722 of the tether 720, the tether termination 770 may rotate about the long axis 722. In some embodiments, the connection 774 may be a threaded connection. And in at least one such embodiment, the connection 774 may include at least one left-handed thread and be configured to withstand a pullout load between 1800 kN and 2300 kN.

Moreover, in some embodiments, the control system 760 may be configured to operate the drive mechanism 900 to couple the spindle 920 to the tether termination 770. And in at least one embodiment, the control system 760 may be configured to operate the motor 930 to control the rotation of the spindle 920 so as to couple the spindle 920 to the tether termination 770. For instance, the control system 760 may be configured to operate the motor 930 to control the rotation of the spindle 920 so as to connect the spindle 920 to the connection 774. Further, in some embodiments, the spindle 920 may be coupled to the tether termination 770 before the tether 720 passes through the spindle 920 and the tether termination 770.

The drive component 940, the at least one coupling component 950, the driven component 960, and a portion of the spindle 920 may each be located within the housing 904. The drive mechanism 900 may include at least one seal (not shown) to seal the spindle 920, the drive component 940, the at least one coupling component 950, and/or the driven component 960 from various environmental conditions, such as moisture and temperature. In some embodiments, the at least one seal may include a radial seal, such as a radial lip seal. Moreover, in some embodiments, the at least one seal may include three seals. Further, in some embodiments, the at least one seal may comprise a rubber, such as a nitrile rubber. And in at least one such embodiment, the at least one seal may comprise SKF Duralife rubber available from SKF. At least one dimension of the at least one seal and/or at least one parameter of the at least one seal (e.g., roundness, runout, parallelism, surface finish, etc.) may be selected based on at least one dimension of the tether 720 and/or loading of the tether 720.

Figure 10:
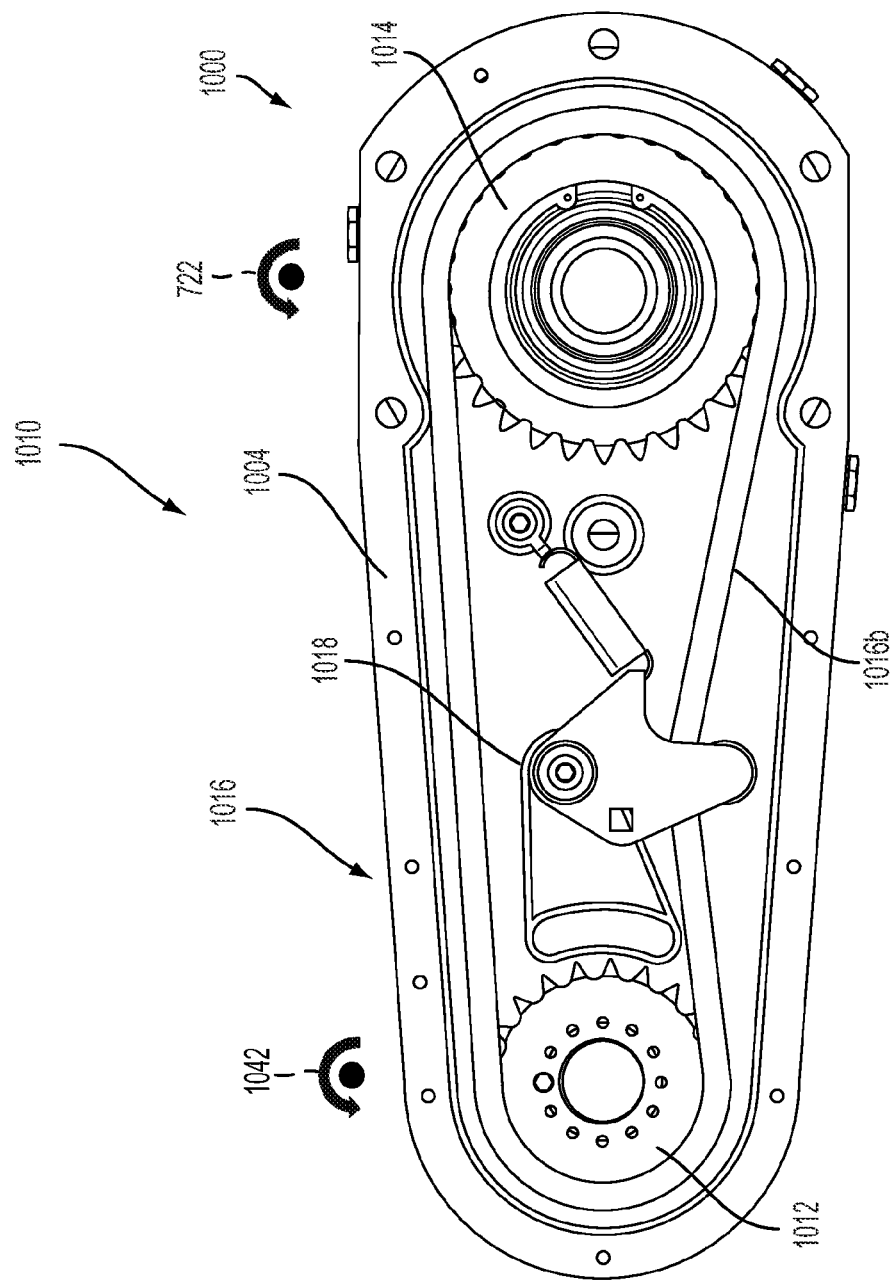
FIG. 10 depicts aspects of a drive mechanism, according to an example embodiment.

FIG. 10 depicts aspects of drive mechanism 1000, according to an example embodiment. The drive mechanism 650, the drive mechanism 750, the drive mechanism 800, and/or the drive mechanism 900 may take the form of or be similar in form to the drive mechanism 1000. Referring to FIG. 10, the drive mechanism 1000 may include a housing 1004 and a chain-and-sprocket assembly 1010. The chain-and-sprocket assembly 1010 may be located in the housing 1004. The housing 1004 may take the form of or be similar in form to the housing 904.

As shown in FIG. 10, the chain-and-sprocket assembly 1010 may include a drive sprocket 1012, a driven sprocket 1014, and a chain 1016. The driven sprocket 1014 may be coupled to a spindle (not shown) and configured to rotate the spindle about the long axis 722 of the tether 720. At least one dimension of the driven sprocket 1014 may be selected based on at least one dimension of the tether 720 and/or loading of the tether 720. In some embodiments, the driven sprocket 1014 may be designed to withstand a torque, for example, of 35 newton-meters (Nm).

In addition, the drive sprocket 1012 may be coupled to a motor (not shown) and the motor may be configured to rotate the drive sprocket 1012 about an axis 1042 substantially parallel to the long axis 722. The axis 1042 may take the form of or be similar in form to the axis 942. At least one dimension of the drive sprocket 1012 may be selected based on at least one dimension of the tether 720 and/or loading of the tether 720. In some embodiments, the drive sprocket 1012 may be designed to withstand a torque, for example, of 35 Nm.

The driven sprocket 1014 may be coupled to the drive sprocket 1012 via the chain 1016. At least one dimension of the chain 1016 may be selected based on at least one dimension of the tether 720 and/or loading of the tether 720. The chain 1016 may be configured to transmit torque from the drive sprocket 1012 to the driven sprocket 1014. With this arrangement, the drive sprocket 1012 may be configured to rotate the driven sprocket 1014 about the long axis 722 of the tether 720. Accordingly, the motor may be configured to rotate the spindle and the tether via the chain-and-sprocket assembly 1010.

The chain-and-sprocket assembly 1010 may further include a tensioner 1018, and the chain 1016 may include a slack-side 1016b. In some embodiments, the tensioner 1018 may be configured to (i) support the slack-side 1016b of the chain 1016 and (ii) maintain tension in the chain 1016. In some embodiments, the chain 1016 may be designed for a service life comprising a certain time period, such as 10 years. Moreover, in some embodiments, the chain 1016 may be lubricated in a fluid. And in at least one such embodiments, the fluid may comprise a ½" synthetic oil bath.

The motor may be configured to rotate the spindle and the tether 720 via other assemblies. For instance, in some examples, the motor may be configured to rotate the spindle and the tether 720 via a belt-and-pulley assembly. In some such examples, the belt-and-pulley assembly may include a drive pulley coupled to a driven pulley via a belt. Moreover, in some examples, the motor may be configured to rotate the spindle and the tether via a gear assembly. And in some such examples, the gear assembly may include a drive gear coupled to a driven gear via one or more coupling gears.

Figure 11:
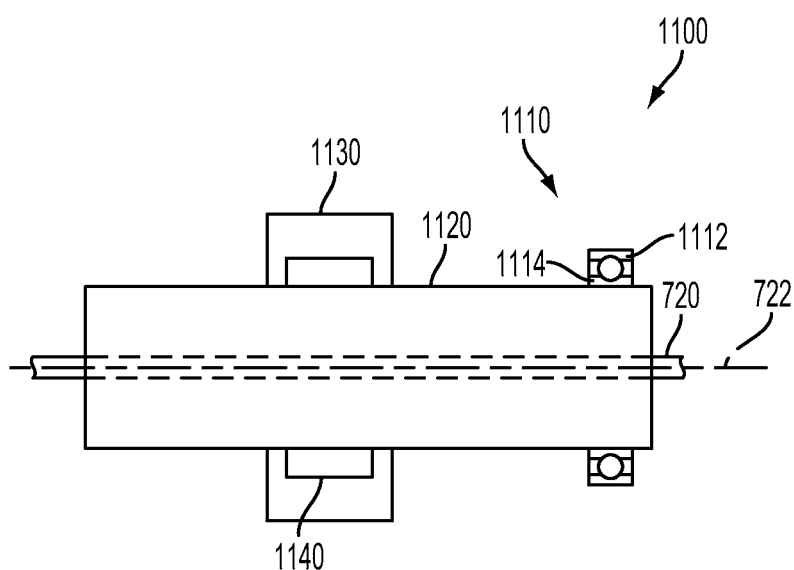
FIG. 11 depicts a drive mechanism, according to an example embodiment.

FIG. 11 depicts a drive mechanism 1100, according to an example embodiment. The drive mechanism 650, the drive mechanism 750, and/or the drive mechanism 800 may take the form of or be similar to the drive mechanism 1100. Referring to FIG. 11, the drive mechanism 1100 includes a bearing 1110, a spindle 1120, a motor 1130, and a driven component 1140. The bearing 1110 includes a fixed portion 1112 and a rotatable portion 1114. In the drive mechanism 1110, the motor 1130 may be coaxial with the spindle 1120.

As shown in FIG. 11, the spindle 1120 may be coupled to the rotatable portion 1114 of the bearing 1110, and the tether 720 may pass through the spindle 1120. With this arrangement, the tether 720 may be coupled to the spindle 1120.

When the tether 720 passes through spindle 1120, the long axis of the tether 722 may correspond with a centerline of the spindle 1120. The bearing 1110 may take the form of or be similar in form to the bearing 910, and the spindle 1120 may take the form of or be similar in form to the spindle 920.

Further, as shown in FIG. 11, the motor 1130 may be coupled to the driven component 1140 and configured to rotate the driven component 1140. In some embodiments, the motor 1130 may be configured to rotate the driven component 1140 about the long axis 722 of the tether 720. Moreover, in some embodiments, the motor 1130 may include a through-bore motor. Further still, as shown in FIG. 11, the driven component 1140 may be coupled to the spindle 1120 and configured to rotate the spindle 1120 relative to the fixed portion 1112 of the bearing 1110. In some embodiments, the driven component 1140 may be configured to rotate the spindle 1120 about the long axis 722 of the tether 720. The driven component 1140 may include, for example, one or more sprockets, pulleys, and/or gears.

III. ILLUSTRATIVE METHODS

Figure 12:
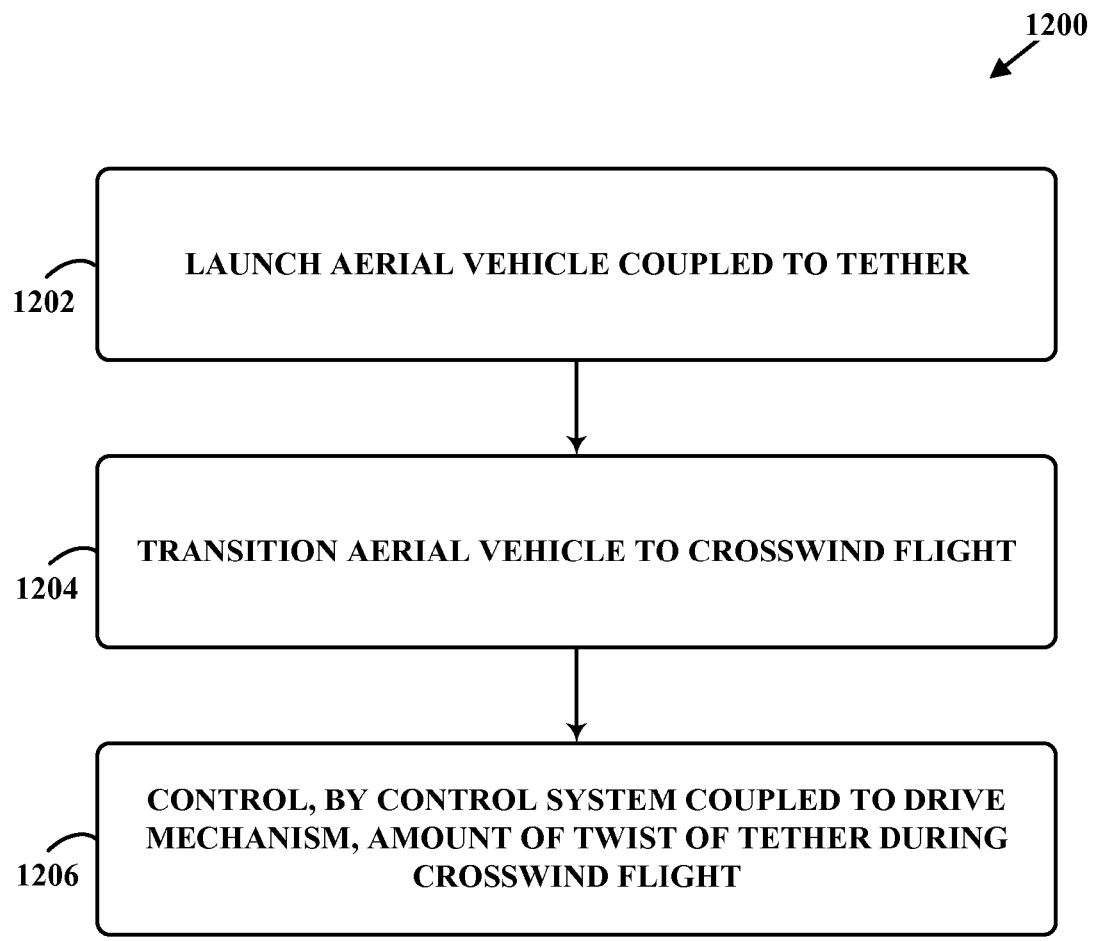
FIG. 12 is a flow chart illustrating a method, according to an example embodiment.

FIG. 12 is a flowchart illustrating a method 1200, according to an example embodiment. Illustrative methods, such as method 1200, may be carried out in whole or in part by a component or components of an AWT, such as by the one or more components of the AWT 100 shown in FIG. 1, and the AWT 200 shown in FIG. 2.

As shown by block 1202, the method 1200 may involve launching an aerial vehicle coupled to a tether. The aerial vehicle may take form of or be similar in form to the aerial vehicle 130, the aerial vehicle 230, and/or the aerial vehicle 330. The tether may take the form of or be similar in form to the tether 120, the tether 220, the tether 420, and the tether 720.

As shown by block 1204, the method 1200 may involve transitioning the aerial vehicle to crosswind flight. In some embodiments, the aerial vehicle may transition to crosswind flight via hover flight and/or forward flight.

As shown by block 1206, the method 1200 may involve controlling, by a control system coupled to a drive mechanism, an amount of twist in the tether during crosswind flight. The control system may take the form of or be similar in form to the control system 248, the control system 660, and the control system 760, and the drive mechanism may take the form of or be similar in form to the drive mechanism 650, the drive mechanism 750, the drive mechanism 800, the drive mechanism 900, the drive mechanism 1000, and the drive mechanism 1100.

In some embodiments, controlling, by the control system coupled to the drive mechanism, the amount of twist in the tether during crosswind flight may involve operating the drive mechanism in a lag mode. Moreover, in some embodiments, controlling, by the control system coupled to the drive mechanism, the amount of twist in the tether during crosswind flight may involve operating the drive mechanism in a lead mode. Further, in some embodiments, controlling, by the control system coupled to the drive mechanism, the amount of twist in the tether during crosswind flight may involve activating and deactivating the drive mechanism.

Further still, in some embodiments, the drive mechanism may comprise a motor coupled to a spindle and configured to rotate the spindle, the tether may pass through the spindle, and controlling, by the control system coupled to the drive mechanism, the amount of twist in the tether during crosswind flight may involve causing the motor to rotate the spindle at a constant rate.

Moreover, in some embodiments, the drive mechanism may comprise a motor coupled to a spindle and configured to rotate the spindle, the tether may pass through the spindle, and controlling, by the control system coupled to the drive mechanism, the amount of twist in the tether during crosswind flight may involve causing the motor to rotate the spindle at a constant rate. Further, in some embodiments, the drive mechanism may comprise a motor coupled to a spindle and configured to rotate the spindle, the tether may pass through the spindle, and controlling, by the control system coupled to the drive mechanism, the amount of twist in the tether during crosswind flight may involve causing the motor to rotate the spindle at a variable rate. And in at least one such embodiment, the variable rate may be determined in reference to at least the rotational rate of the tether.

Further, in some embodiments, the method 1200 may further involve determining the value of an operational or environmental parameter and operating the drive mechanism to control tether twist based at least in part on the determined operational or environmental parameter. And in at least one such embodiment, the operational or environmental parameter comprises a tension on the tether, a load on the aerial vehicle, a position of the aerial vehicle, a velocity of the aerial vehicle, a wind speed, a temperature of the at least one conductor, an environmental temperature, a resistance of the at least one conductor, or the amount of electrical current carried by the at least one conductor.

IV. CONCLUSION

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are contemplated herein.

What is claimed is:

1. A system comprising:
 a tether comprising:
  a distal tether end;
  a proximate tether end; and
  at least one insulated electrical conductor;
 a tether gimbal assembly, wherein the tether gimbal assembly is coupled to the tether;
 a drive mechanism coupled to the tether gimbal assembly, wherein the drive mechanism comprises:
  a housing fixed to the tether gimbal assembly;
  a spindle rotatably coupled to the housing, wherein the tether is coupled to the spindle and rotates in conjunction with the spindle; and
  a motor coupled to the spindle and configured to rotate the spindle and the tether; and a control system configured to operate the drive mechanism to control twist in the tether.

2. The system of claim 1, wherein the spindle is rotatably coupled to the housing via at least a spherical thrust roller bearing.

3. The system of claim 1, wherein the motor is offset from the spindle.

4. The system of claim 1, wherein the motor is coaxial with the spindle.

5. The system of claim 1, wherein the motor is coupled to a drive component and configured to rotate the drive component, wherein the drive component is coupled to a driven component and configured to rotate the driven component, and wherein the driven component is coupled to the spindle and configured to rotate the spindle.

6. The system of claim 5, wherein the drive component and the driven component are located in the same plane.

7. The system of claim 5, wherein the drive component comprises a drive sprocket, and wherein the driven component comprises a driven sprocket.

8. The system of claim 5, wherein the drive component is coupled to the driven component via a chain.

9. The system of claim 5, wherein the drive component comprises a drive pulley, and wherein the driven component comprises a driven pulley.

10. The system of claim 9, wherein the drive component is coupled to the driven component via a belt.

11. The system of claim 5, wherein the drive component comprises a drive gear and the driven component comprises a driven gear.

12. The system of claim 11, wherein the drive component is coupled to the driven component via one or more gears.

13. The system of claim 1, further comprising a tether termination coupled to the spindle, wherein the tether passes through the tether termination.

14. The system of claim 13, wherein the tether termination is coupled to the spindle by a threaded connection.

15. The system of claim 13, wherein the control system is configured to operate the drive mechanism to couple the tether termination to the spindle.

* * * * *